United States Patent [19]
Kato

[11] Patent Number: 5,468,426
[45] Date of Patent: Nov. 21, 1995

[54] PROCESS FOR COOLING WATER AND COOLING TOWER

[75] Inventor: Kanji Kato, Chiba, Japan

[73] Assignee: Ishikawajima-Harima Jukogyo Kabushiki Kaisha, Tokyo, Japan

[21] Appl. No.: 311,735

[22] Filed: Sep. 23, 1994

[30] Foreign Application Priority Data

Dec. 29, 1993 [JP] Japan .................................. 5-349672

[51] Int. Cl.⁶ ........................................................ B01F 3/04
[52] U.S. Cl. ................ 261/153; 261/112.1; 261/DIG. 77
[58] Field of Search ............................ 261/153, 112.1, 261/DIG. 77

[56] References Cited

U.S. PATENT DOCUMENTS

| | | | |
|---|---|---|---|
| 3,997,635 | 12/1976 | Hallgren | 261/112.1 |
| 4,252,752 | 2/1981 | Flandroy | 261/DIG. 77 |
| 4,374,071 | 2/1983 | Regehr | 261/DIG. 77 |
| 4,427,607 | 1/1984 | Korsell | 261/DIG. 77 |
| 5,054,197 | 10/1991 | Kato et al. | |

*Primary Examiner*—Tim R. Miles

*Attorney, Agent, or Firm*—Oblon, Spivak, McClelland, Maier & Neustadt

[57] ABSTRACT

Water to be cooled is sprayed through water spray ports at a bottom of an upper water vessel into a filler unit having a plurality of heat exchange surface members extending in parallel with each other to define flow passages between them and concurrently ambient air is sucked transversely into the flow passages. Thus, the water flowing down over the heat exchange surface members is cooled by the ambient air in a cross flow manner. In such cooling of water, some of the flow passages are sectioned so as to supply the water in the upper water vessel to some of flow passages so that in a normal condition with no fear of white smoke being generated, the water is sprayed over all of the heat exchange surface members and direct cooling is effected in every flow passage by the ambient air. In a condition with a possibility of the white smoke being generated, spray of the water into some of the flow passages is interrupted so that the direct cooling by the ambient air of the water in the flow passages into which the water is sprayed is effected simultaneously with dry heating of the ambient air flowing through the flow passages into which no water is sprayed and wet air resulting from the direct cooling is mixed with dry air resulting from the dry heating. As a result, the white smoke is prevented from being generated.

33 Claims, 19 Drawing Sheets

PROCESS FOR COOLING WATER AND COOLING TOWER

BACKGROUND OF THE INVENTION

The present invention relates to a process for cooling water and a cooling tower.

There has been more and more demand for cooling towers for cooling water used in large quantities in various plants, factories, buildings and the like.

A conventional cooling tower as shown in FIG. 1 has an outlet 3 with an axial flow fan 2 at a top of a casing 1, air inlets 4 at an outer periphery of the casing 1, an upper water vessel 5 at the upper portion of the casing 1 and a heat exchanger 9 below the water vessel 5 in which water 7 to be cooled is sprayed through spray ports 6 of the vessel 5 and is heat-exchanged in a cross flow manner with ambient air 8 sucked transversely into the casing 1 through the air inlets 4, thereby cooling the water 7.

The heat exchanger 9 may have a dry type air heating unit 11 in the form of finned tubes 10 immediately below the water vessel 5 and a filler unit 12 in the form of a number of heat transfer surface members with irregular surfaces, made of sheet-like synthetic resin and arranged in parallel with each other to define flow passages or in the form of assembled sheet-like members. Reference numeral 13 denotes a lower water vessel below the filler unit 12 to recover the cooled water.

With the cooling tower of the type described above, the water 7 flows down through the finned tubes 10 of the dry type air heating unit 11 and then over the heat transfer surface members of the filler unit 12 while the ambient air 8 is sucked through the inlets 4 and is directed to flow transversely of the units 11 and 12, thereby cooling the water 7.

The water 7 flowing down along the heat transfer surface members of the filler unit 12 is directly heat-exchanged with the ambient air 8 and is effectively cooled. Ability or capability of a cooling tower is substantially dependent upon volume of the filler unit 12. The air 8 having been heat-exchanged with the water 7 in the filler unit 12 becomes wet air 14 which has a high temperature and a moisture content of substantially 100%. If the wet air 14 were directly discharged out of the cooling tower, it would become white smoke when the ambient temperature is low. Such white smoke will be abhorred by the neighborhood since it seems as if the white smoke would contaminate their environment. Moreover, there is a fear that the white smoke may be erroneously regarded as a fire at night due to optical illusion or the like. Thus, the demand for preventing white smoke from being generated is increased.

To this end, in the cooling tower as shown in FIG. 1 with the water 7 flowing down through the finned tubes 10, the ambient air 8 flowing along outer peripheral surfaces of the tubes 10 is heated in dry manner into dry air 15 having an extremely low moisture content. The dry air 15 is mixed with the wet air 14 by the fan 2 to reduce the moisture content of the air to be discharged through the outlet 3, thereby preventing the white smoke from being generated.

Such a cooling tower, which is provided with the dry type air heating unit 11 in the form of the finned tubes 10 exclusive for generating the dry air 15 for prevention of the white smoke from being generated, is much complicated in structure and highly expensive in production cost. Because of indirect heat exchange by the finned tubes 10, the heat exchange efficiency cannot be satisfactorily enhanced and in compensation therefor the dry type air heating unit 11 is increased in size. It follows therefore that if the filler unit 12, which is a major cooling part, is not changed in volume, the cooling tower must be increased in height or volume and if the cooling tower is not changed in height or volume, the filler unit 12 must be decreased in volume and the cooling efficiency drops.

In order to overcome these problems, a cooling tower as shown in FIGS. 2 and 3 has been proposed in which the heat exchanger 9 comprises at least two stacks of or upper and lower filler units 16a and 16b. The uppermost filler unit 16a has heat exchange surface members 17 with irregular surfaces and made of sheet-like synthetic resin which extend in parallel with each other to define flow passages 18. Some of the flow passages 18 are closed at their tops with caps 19 so that the water 7 is prevented from flow down through the closed flow passages 18. If need be, the caps 19 may be of opening and closing type. Reference numeral 20 denotes an intermediate water vessel.

Since the caps 19 are provided for closing some flow passages 18 as described above, not the water 7 but only the ambient air 8 flows down through the closed flow passages 18 to produce the dry air 15. The dry air 15 is mixed with the wet air 14 which has cooled the water 7 at the non-closed flow passages 18 in the upper filler unit 16a and at the the lower filler unit 16b and the mixed air is discharged, thereby preventing the white smoke from being generated.

With the caps 19 being of opening and closing type as mentioned above, all the caps 19 may be opened to make the water 7 flow down over all of the heat exchange surface members 17 to thereby maximize the cooling capability of the filler units 16a and 16b.

However, such caps 19 have drawbacks. If the caps 19 are securely attached to the upper ends of some flow passages 18, there always remain spaces in the upper filler unit 16a for producing the dry air even upon use of the cooling tower in a condition of no white smoke being generated, which accordingly lowers the cooling capability of the cooling tower.

With the caps 19 being of opening and closing type, the operation of closing or opening the caps 19 is cumbersome. Because of the heat exchange surface members 17 being made of sheet-like synthetic resin for lightness in weight and arranged in a narrow spaced-apart relationship, it becomes technically very difficult to install the caps 19 for opening and closing at upper ends of the flow passages 18 defined by thin synthetic resin sheets. Even if the caps 19 are managed to be installed at the upper ends of the flow passages 18 for closing and opening of the caps 19, its structure becomes very complicated and its maintenance becomes extremely difficult since the moving parts are at the narrow spaces. Thus, such covers 19 are impractical in use.

In view of the above, the present invention has for its object to provide a process for cooling water and a cooling tower in which, as to some flow passages in a filler unit, direct cooling of the water by ambient air can be freely and readily switched into dry type heating of the ambient air and vice versa.

BRIEF SUMMARY OF THE INVENTION

A cooling tower according to a first embodiment of the present invention is a cooling tower having an outlet with an axial flow fan at a top of a casing, air inlets at an outer periphery of the casing, an upper water vessel at the upper portion of the casing and a heat exchanger below the upper water vessel in which water to be cooled is sprayed through water spray ports of the water vessel and is heat-exchanged in a cross flow manner with ambient air sucked transversely into the casing through the air inlets, characterized in that said heat exchanger comprises one or more filler units stacked vertically, that one filler unit or at least an uppermost filler unit in said vertically stacked filler units includes a plurality of heat exchange surface members extending in parallel with each other to define flow passages therebetween, that section inlet means are provided which are communicated with some of the flow passages in the filler unit through sectioned chambers and which have upper water intake ports higher than the water spray ports of the upper water vessel, thereby providing selective dry/wet spaces in said filler units and that a liquid-level control unit is provided to control height of a liquid level in the upper water vessel.

The cooling process in this cooling tower is as follows. In a normal condition such as in summer with no fear of the white smoke being generated, the level of the water in the upper water vessel is maintained above the upper water intake ports so that the water in the upper water vessel flows not only into the water spray ports but also into the upper water intake ports and is sprayed over all of the heat exchange surface members in the filler unit. As a result, direct cooling of the water by the ambient air in all the flow passages is effected and the whole of the filler unit can be operated at maximum capacity to cool the water at full capacity. In a condition such as in winter with a possibility of the white smoke being generated, the level of the water in the upper water vessel is maintained below the height of the upper water intake ports so that spraying of the water into the flow passages communicated with the upper water intake ports is interrupted. As a result, the direct cooling of the water by the ambient air in the flow passages into which the water is sprayed is effected and concurrently the dry heating of the ambient air is effected in the flow passages into which no water is sprayed. The wet air resulting from the direct cooling is mixed with the dry air resulting from the dry heating to prevent the white smoke from being generated.

The upper water intake ports of the section inlet means may be of different heights so that the number of flow passages into which no water is sprayed can be changed stepwise by controlling the level of the water in the upper water vessel. The liquid-level control unit may have liquid-level detectors so that the liquid level in the upper water vessel can be suitably controlled in response to output signals from the liquid-level detectors. In a filler unit except for an uppermost filler unit and having section inlet means, a water deflecting plate may be installed above each of the upper water intake ports of the section inlet means so that the water from the upstream filler unit can be prevented from flowing into said upper water intake ports.

A second embodiment of a cooling tower in accordance with the present invention is a cooling tower having an outlet with an axial flow fan at a top of a casing, air inlets at an outer periphery of the casing, an upper water vessel at the upper portion of the casing and a heat exchanger below the upper water vessel in which water to be cooled is sprayed through water spray ports of the water vessel and is heat-exchanged in a cross flow manner with ambient air sucked transversely into the casing through the air inlets, characterized in that said heat exchanger comprises one or more filler units stacked vertically, that said one filler unit or at least an uppermost filler unit in said vertically stacked filler units includes a plurality of heat exchange surface members extending in parallel with each other to define flow passages therebetween, that water flow ports are provided through a bottom of the upper water vessel and are communicated with some of the flow passages in the filler unit through sectioned chambers and that valves are provided for opening and closing of said water flow ports and valve drives are provided for driving the opening and closing of said valves.

The cooling process in this cooling tower is as follows. In a normal condition such as in summer with no fear of the white smoke being generated, the valves are opened for the water flow ports in the upper water vessel so that the water in the upper water vessel flows not only through the water spray ports but also through the water flow ports of the upper water vessel and is sprayed over all of the heat exchange surface members in the filler unit. As a result, the direct cooling of the water by the ambient air in all the flow passages is effected and the whole of the filler unit can be operated at maximum capacity to cool the water at full capacity. In a condition such as in winter with a possibility of the white smoke being generated, the valves are closed for the water flow ports in the upper water vessel so that spraying of the water into the flow passages communicated with the water flow ports is interrupted. As a result, direct cooling of the water by the ambient air in the flow passages into which the water is sprayed is effected and concurrently dry heating of the ambient air is effected in the flow passages into which no water is sprayed. The wet air resulting from the direct cooling is mixed with the dry air resulting from the dry heating to prevent the white smoke from being generated.

Control may be made such that some of the valves are closed and the other of the valves are opened. Then, the number of flow passages into which no water is sprayed can be arbitrarily changed by such controlling of the closing and opening of the valves. The valves may have dropped-water dispersing plates so that, when the valves are opened, the water is dropped onto the dispersing plates and is dispersed, thereby enhancing the cooling effect.

A cooling tower according to a third embodiment of the present invention is a cooling tower having an outlet with an axial flow fan at a top of a casing, air inlets at an outer periphery of the casing, an upper water vessel at the upper portion of the casing and a heat exchanger below the upper water vessel in which water to be cooled is sprayed through spray ports of the water vessel and is heat-exchanged in a cross flow manner with ambient air sucked transversely into the casing through the air inlets, characterized in that said heat exchanger comprises one or more filler units stacked vertically, that said one filler unit or at least an uppermost filler unit in said vertically stacked filler units includes a plurality of heat exchange surface members extending in parallel with each other to define flow passages therebetween, that vertically extensible and retractable section inlet means are provided which are communicated with some of the flow passages in the filler unit through sectioned chambers, thereby providing selective dry/wet spaces in said filler units and that lift means are provided to control height of upper water intake ports of said section inlet means.

The cooling process in this cooling tower is as follows. In a normal condition such as in summer with no fear of the white smoke being generated, the upper water intake ports are lowered below the liquid level of the upper water vessel so that the water in the upper water vessel flows not only in the water spray ports but also in the upper water intake ports of the upper water vessel and is sprayed over all of the heat exchange surface members in the filler unit so that the direct cooling of the water by the ambient air in all the flow passages is effected and the whole of the filler unit can be operated at maximum capacity to cool the water at full capacity. In a condition such as in winter with a possibility of the white smoke being generated, the upper water intake ports are raised above the liquid level of the upper water vessel so that spraying of the water into the flow passages communicated with the upper water intake ports is interrupted. As a result, direct cooling of the water by the ambient air in the flow passages into which the water is sprayed is effected and concurrently dry heating of the ambient air is effected in the flow passages into which no water is sprayed. The wet air resulting from the direct cooling is mixed with the dry air resulting from the dry heating to prevent the white smoke from being generated.

In any of the cooling towers of the invention described above, the sectioned chambers may be defined by extending the heat exchange surface member themselves. This can minimize a space between the filler unit and the upper water vessel and is effective for cooling towers to be newly built. Alternatively, the sectioned chambers may be defined at the water spray zone between the upper water vessel and the filler unit by partition plates sandwiching the heat exchange surface members which define a flow passage. This is effective for any existing cooling towers.

The present invention will become more apparent from the following description of preferred embodiments thereof with reference to the accompanying drawings.

BRIEF DESCRIPTION OF THE DRAWINGS

The same reference numerals are used to designate similar parts throughout the figures.

DETAILED DESCRIPTION OF THE PREFERRED EMBODIMENTS

Figure 4:
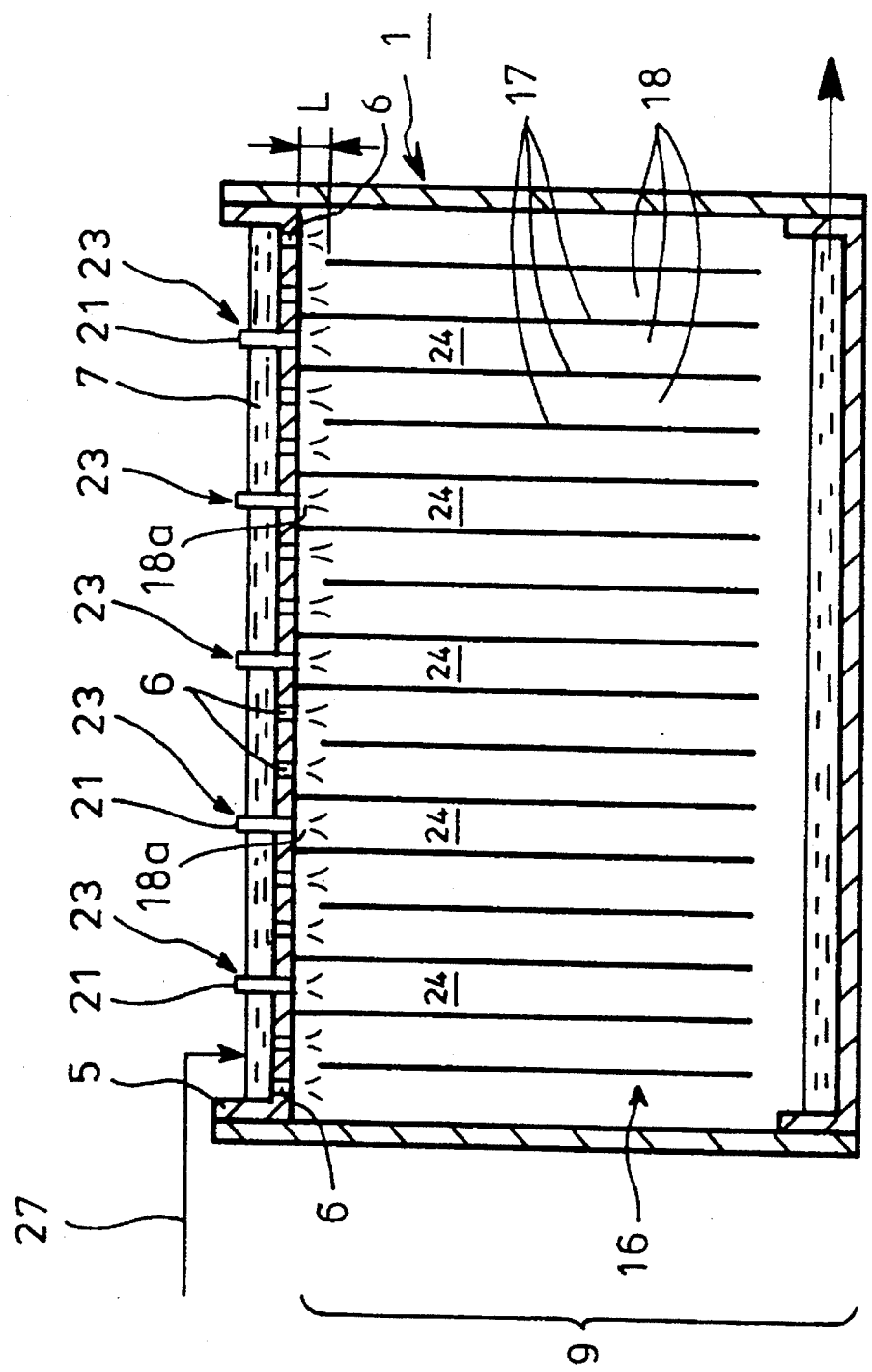
FIG. 4 is a side view in vertical section of a first embodiment of the present invention.
Figure 5:
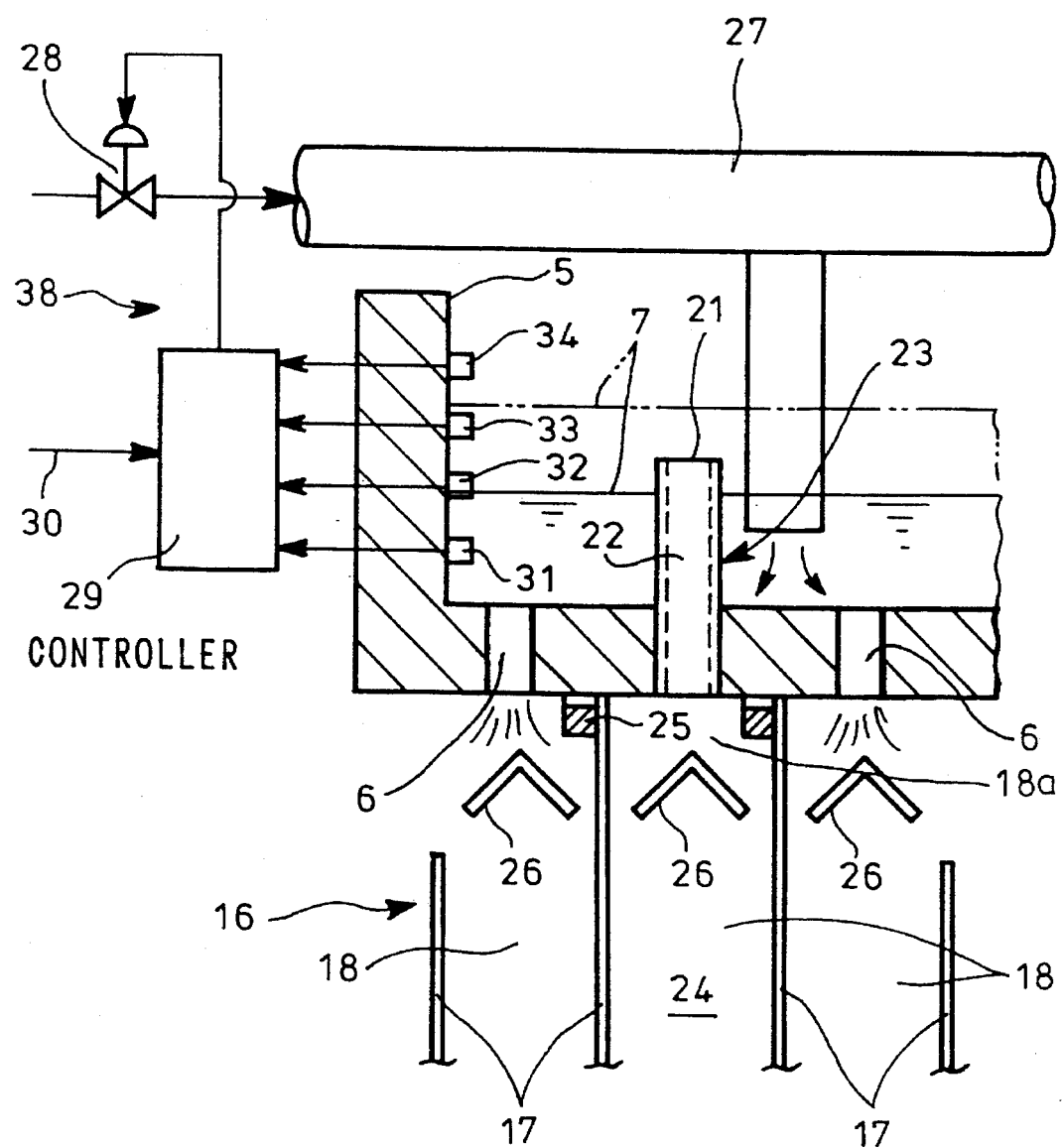
FIG. 5 is a partial sectional view on an enlarged scale thereof.
Figure 6:
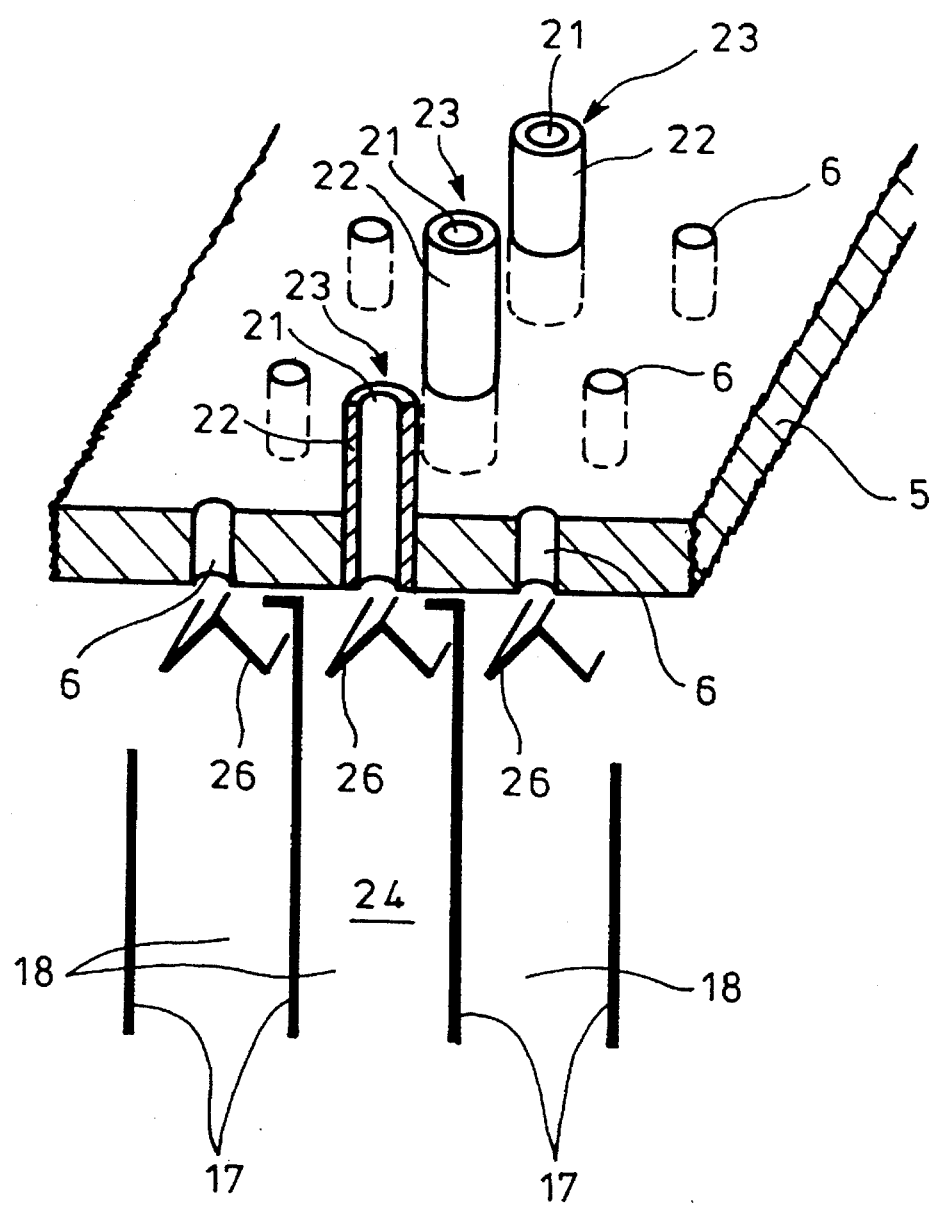
FIG. 6 is a perspective view illustrating section inlet means shown in FIG. 5.

In a first embodiment of the present invention shown in FIGS. 4 to 6, the heat exchanger 9 for the heat exchange between the water 7 to be cooled and the ambient air 8 comprises a single filler unit 16 having a plurality of heat exchange surface members 17 extending in parallel with each other to define the flow passages 18.

Some of the flow passages 18 in the filler unit 16 are communicated through sectioned chambers 18a at a water spray space or zone L with section inlet means 23. Each of the section inlet means 23 comprises a water intake pipe 22 having an upper water intake port 21 located at a predetermined height above the bottom or water spray ports 6 of the upper water vessel 5. Thus, selective dry/wet spaces 24 are provided for some of the flow passages 18 in the filler unit 16.

In the first embodiment shown in FIG. 5, the heat exchange surface members 17 which define therebetween the flow passage 18 communicated with the section inlet means 23 extend upwardly and are mounted through mounting members 25 on an undersurface of the upper water vessel 5, thereby defining a sectioned chamber 18a. The water intake pipe 22 is securely fitted into the water spray port 6 which is communicated with the flow passage 18 defined by said heat exchange surface members 17. A dispersing plate 26 is disposed below each of water spray ports 6 in the flow passages 18 and below each of the water inlet pipes 22 in the selective dry/wet spaces 24 so as to disperse the water 7 over the heat exchange surface members 17. The dispersing plates 26 may be eliminated in the case where sufficient water spray over the heat exchange surface members 17 is ensured by closely arranging the water spray ports 6 and the water inlet pipes 22 and/or by using water spray nozzles (not shown) which have been used in conventional cooling towers. Instead of the heat exchange surface members 17 being mounted via the mounting members 25 on the undersurface of the upper water vessel 5, the members 17 may be suspended from a supporting frame comprising the mounting members 25 made of hard material.

The water 7 to be cooled is supplied to the upper water vessel 5 through a water supply pipe 27 having a flow regulating valve 28. A liquid-level control unit generally indicated by reference numeral 38 serves to control a volume of water supplied to the upper water vessel 5 such that the opening degree of the flow regulating valve 28 of the supply pipe 27 is controlled in response to a switching signal 30 applied to a controller 29. The control unit 38 also has paired low liquid-level detectors 31 and 32 and paired high liquid-level detectors 33 and 34. Output signals from the detectors 31, 32, 33 and 34 are applied to the controller 29 for monitoring to maintain the level of the water 7 in the upper water vessel 5 to a required range. More particularly, the low liquid-level detectors 31 and 32 serves for monitoring to maintain the water level in the water vessel 5 within a predetermined range below the upper water intake port 21 of the section inlet means 23 and the high liquid-level detectors 33 and 34 serves for monitoring to maintain the liquid level in the water vessel 5 at a predetermined range above the upper water intake port 21 of the section inlet means 23.

Figure 7:
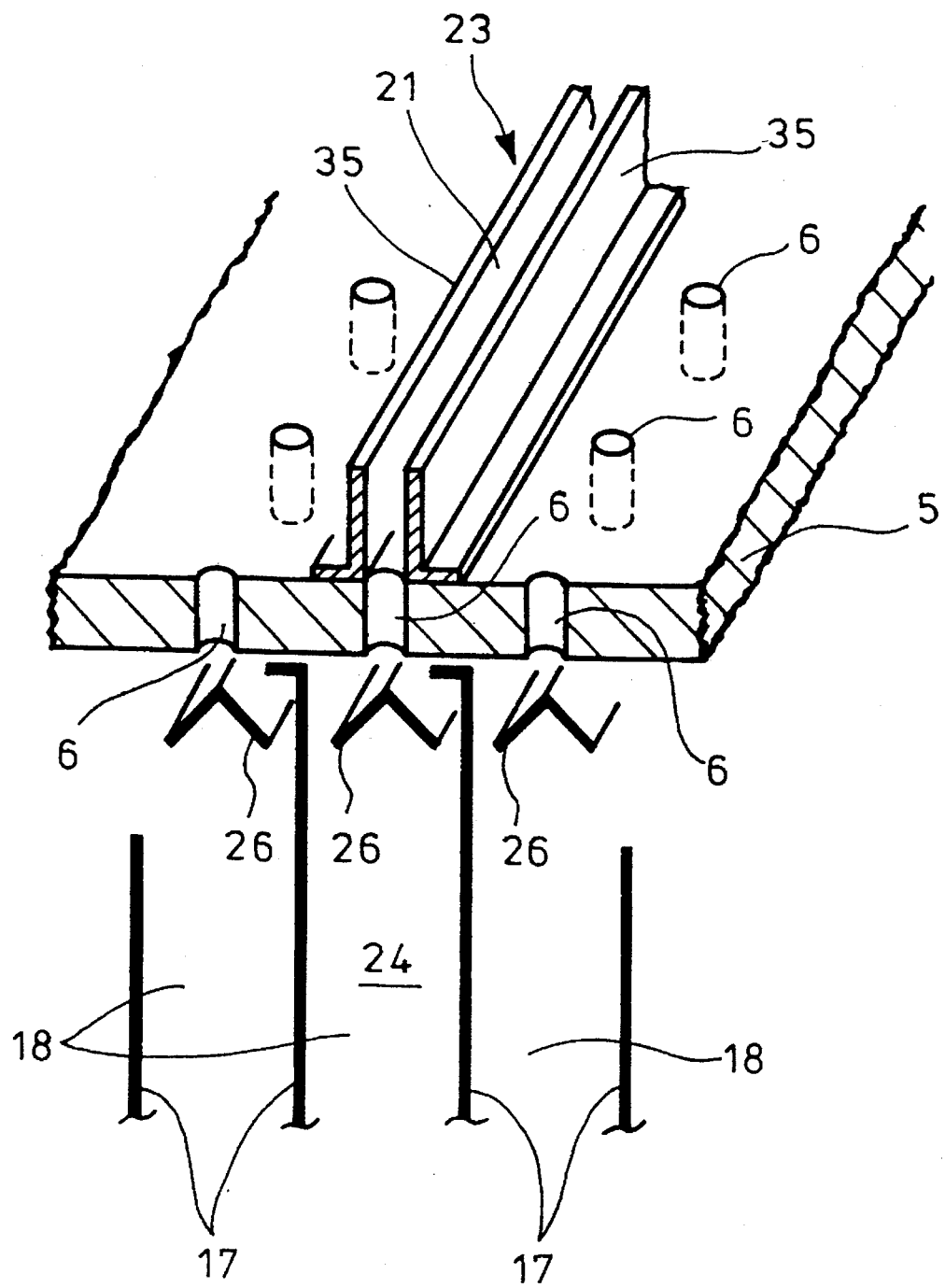
FIG. 7 is a perspective view illustrating a modification of the section inlet means shown in FIG. 6.
Figure 8:
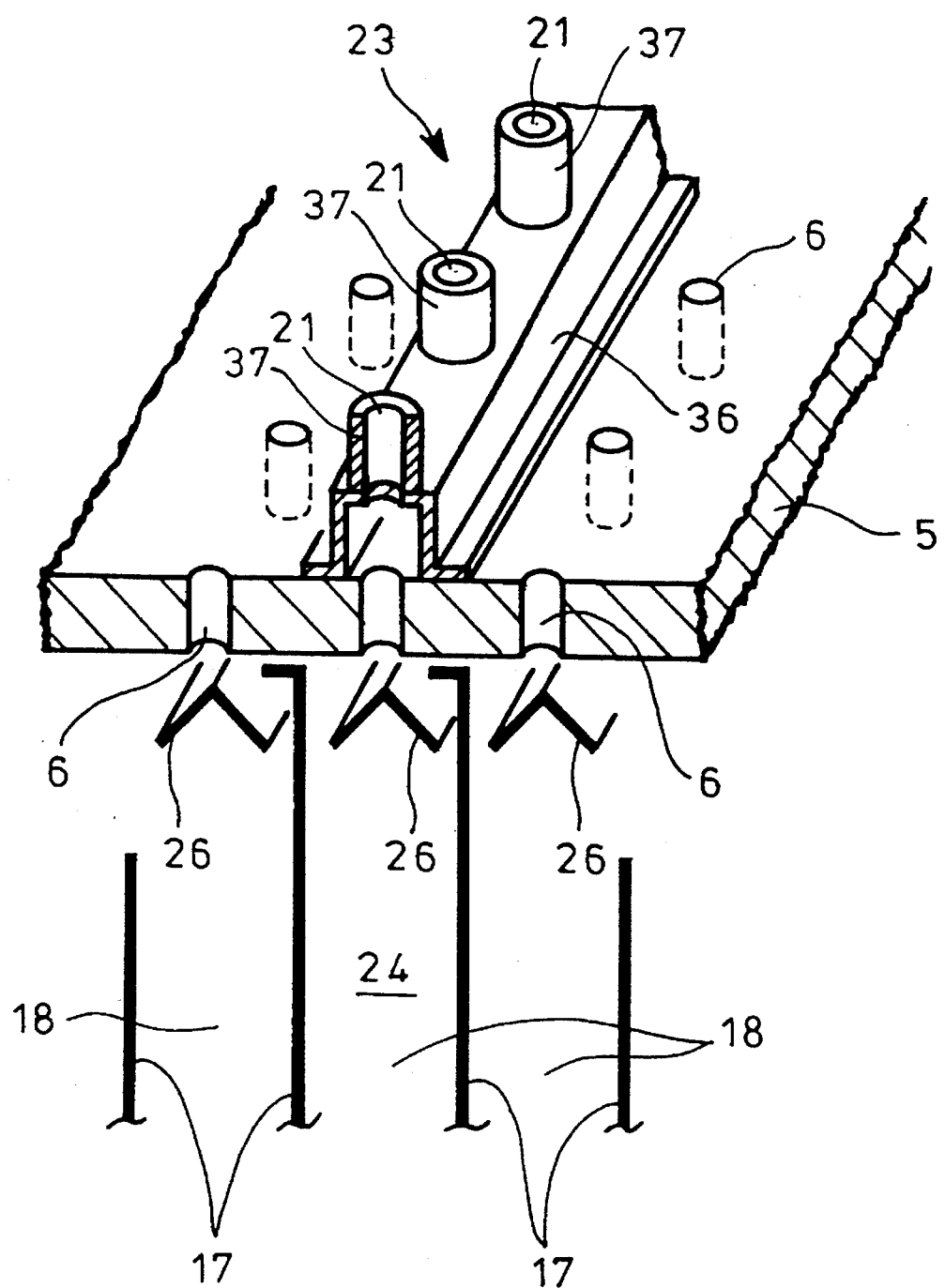
FIG. 8 is a perspective view illustrating a further modification of the section inlet means shown in FIG. 6.

FIGS. 7 and 8 illustrate modifications of the section inlet means 23. In FIG. 7, a pair of water intake plates 35 each having a predetermined height are mounted on or extend from the bottom of the water vessel 5 such that the water spray ports 6 communicated with the flow passage 18 as selective dry/wet space 24 are interposed between the paired water intake plates 35, thereby providing a slit-like upper water intake port 21. In FIG. 8, a channel member 36 is disposed at the bottom of the upper water vessel 5 such that the channel member 36 encloses therein the water spray ports 6 communicated with the flow passage 18 as selective dry/wet space 24. Water intake pipes 37 each having the upper water intake port 21 extend upwardly by a predetermined height from a top surface of the channel member 36.

Figure 9:
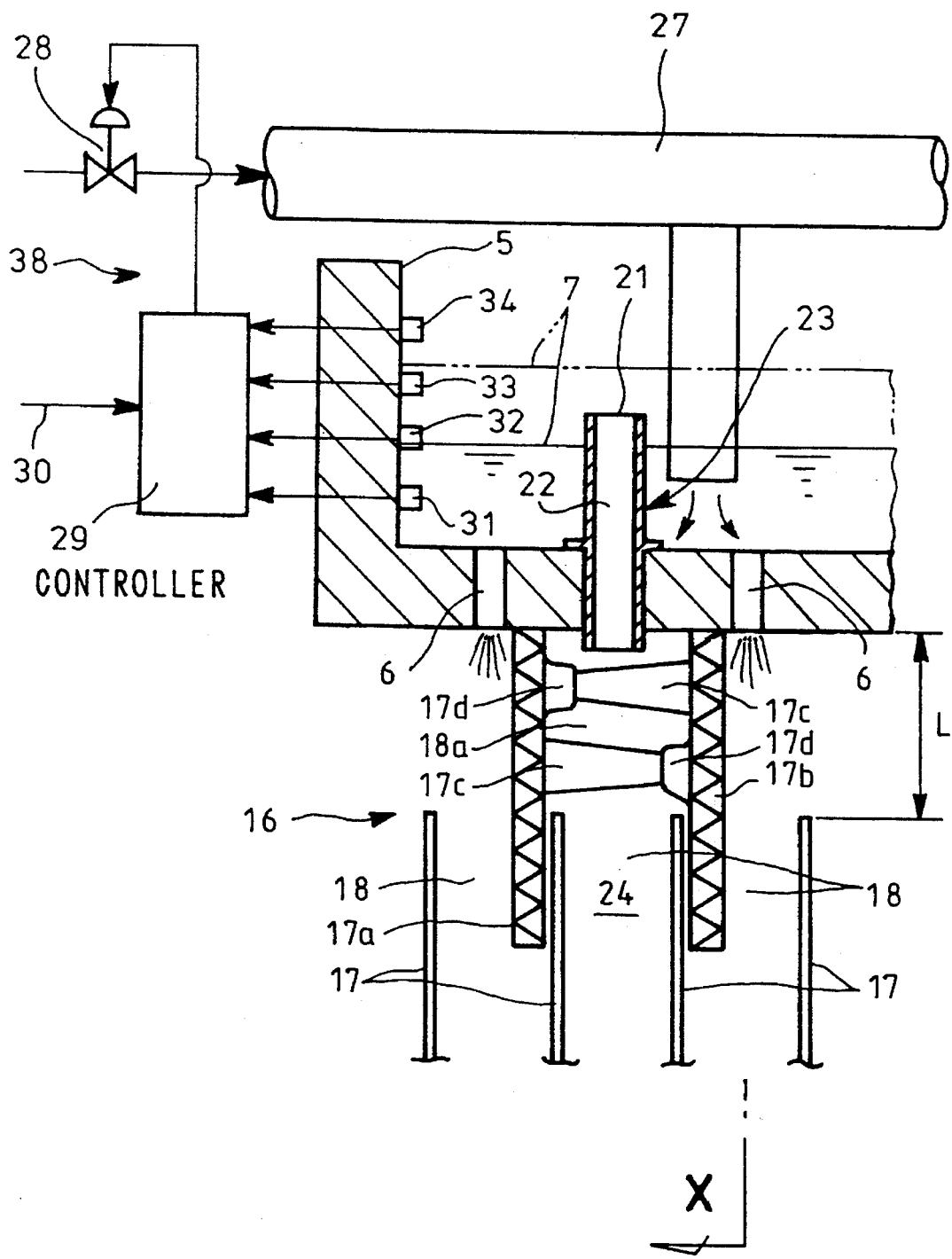
FIG. 9 is a partial detailed view illustrating a modification of the sectioned chamber shown in FIG. 5 and defined by partition walls.
Figure 10:
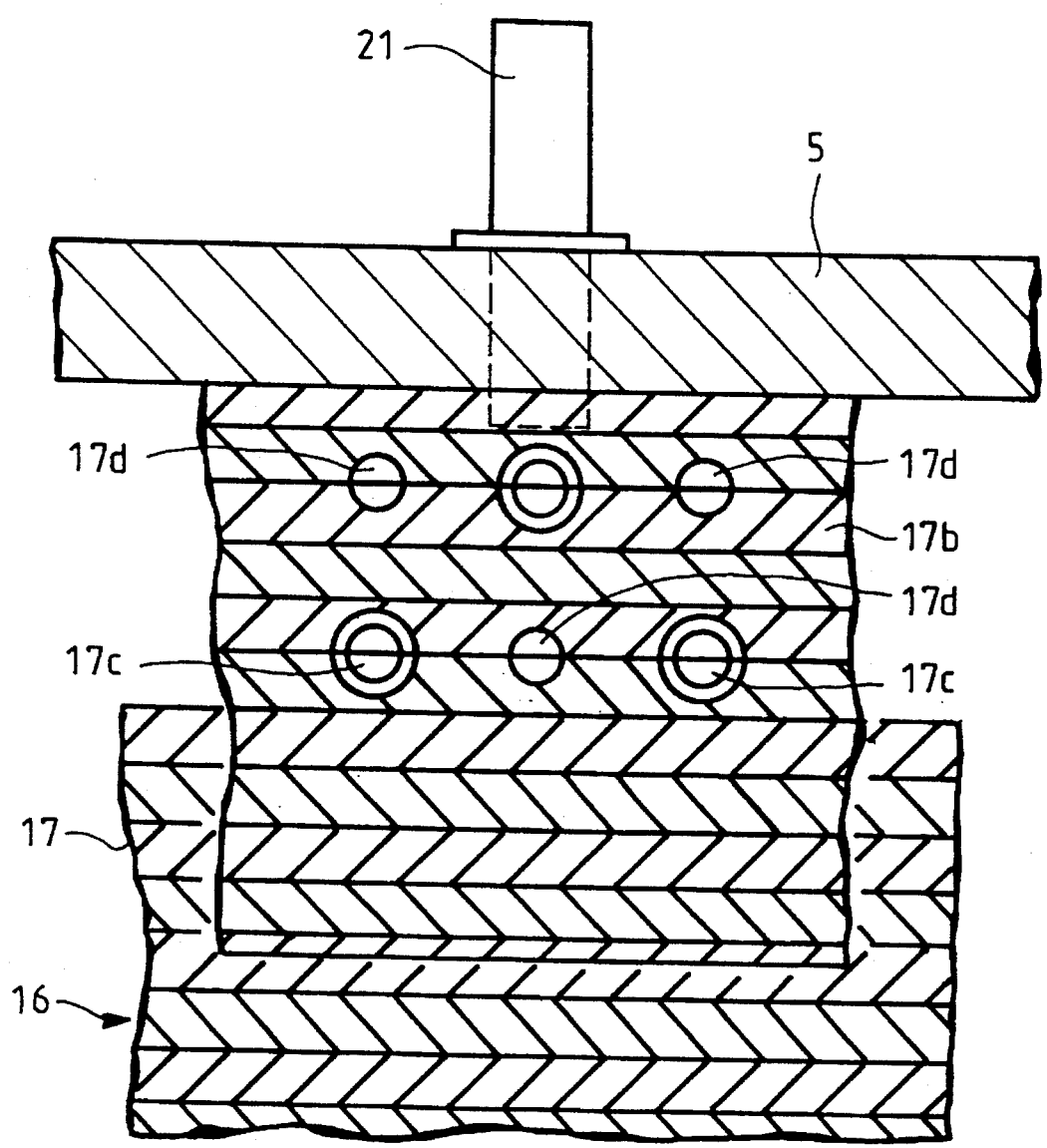
FIG. 10 is a view looking in the direction indicated by the arrow X in FIG. 9.

FIGS. 9 and 10 illustrate a modification of the sectioned chamber 18a shown in FIG. 5. In order to communicate a predetermined flow passage 18 in the filler unit 16, which is disposed below the upper water vessel 5 at the water spray zone L, with the section inlet means 23 through the sectioned chamber 18a, joined to outer surfaces of the heat exchange surface members 17 are partition plates 17a and 17b fabricated from a corrugated plastic sheets such that upper ends of the partition plates 17a and 17b contact the undersurface of the upper water vessel 5 while lower ends of the partition plates 17a and 17b extend beyond the upper ends of the heat exchange surface members 17, thereby defining the sectioned chamber 18a which is communicated with the selective dry/wet space 24. As shown in FIG. 9, the partition plates 17a and 17b are so arranged that their longer convex portions 17c are in opposed relationship with their shorter convex portions 17d. These longer and shorter convex portions 17c and 17d are bonded together with adhesives. Such bonded convex portions 17c and 17d serve to disperse the water 7. The structure with the partition plates 17a and 17b just described above is satisfactorily applicable to any existing cooling tower having a water spray space or zone L.

In a normal condition with no fear of the white smoke being generated due to the ambient temperature being not so low, the switching signal 30 for maintaining the liquid level in the water vessel 5 to a higher level is outputted to the controller 29 of the liquid-level control unit 38 so that the level of the water 7 in the vessel 5 is above the upper intake port 21. In response to the switching signal 30, the controller 29 is controlled to increase the degree of opening of the flow regulating valve 28 and at the same time receives output signals from the liquid-level detectors 31–34 to control the degree of opening of the flow rate regulating valve 28 such that the level of the water in the water vessel 5 is always between the high liquid-level detectors 33 and 34.

In this way, the water level in the upper water vessel 5 is maintained as indicated by the two-dot chain line at a level higher than the upper water intake port 21. Therefore, the water 7 is sprayed via the spray ports 6 and the upper water intake ports 21 over the all heat exchange surface members 17 so that in every of the flow passages 18, the direct cooling of the water 7 by the ambient air 8 (See FIG. 2) is carried out. Thus, as in summer, when a large quantity of water is required and there is no fear of the white smoke being generated, whole of the filler unit 16 can be utilized at the maximum capacity to maximize the capacity of cooling the water 7.

In a condition as in winter with fear of the white smoke being generated, the switching signal 30 for maintaining the water level in the upper water vessel 5 to a lower level is applied to the controller 29 which in turn automatically controls the flow regulating valve 28 such that the liquid level is between the low liquid-level detectors 31 and 32. With the liquid level being maintained at the lower level in the manner described above, spraying of the water 7 into the selective dry/wet spaces 24 communicated with the upper water intake ports 21 is stopped or interrupted. As a result, the direct cooling of the water 7 by the ambient air 8 in the flow passages 18 into which the water 7 is sprayed is carried out simultaneous with the dry heating of the ambient air 8 flowing through the spaces 24 into which no water 7 is sprayed. Therefore, the wet air 14 (See FIG. 2) resulting from the direct cooling in the flow passages 18 is mixed with the dry air 15 resulting from the dry heating in the spaces 24, thereby preventing the white smoke from being generated.

Figure 11:
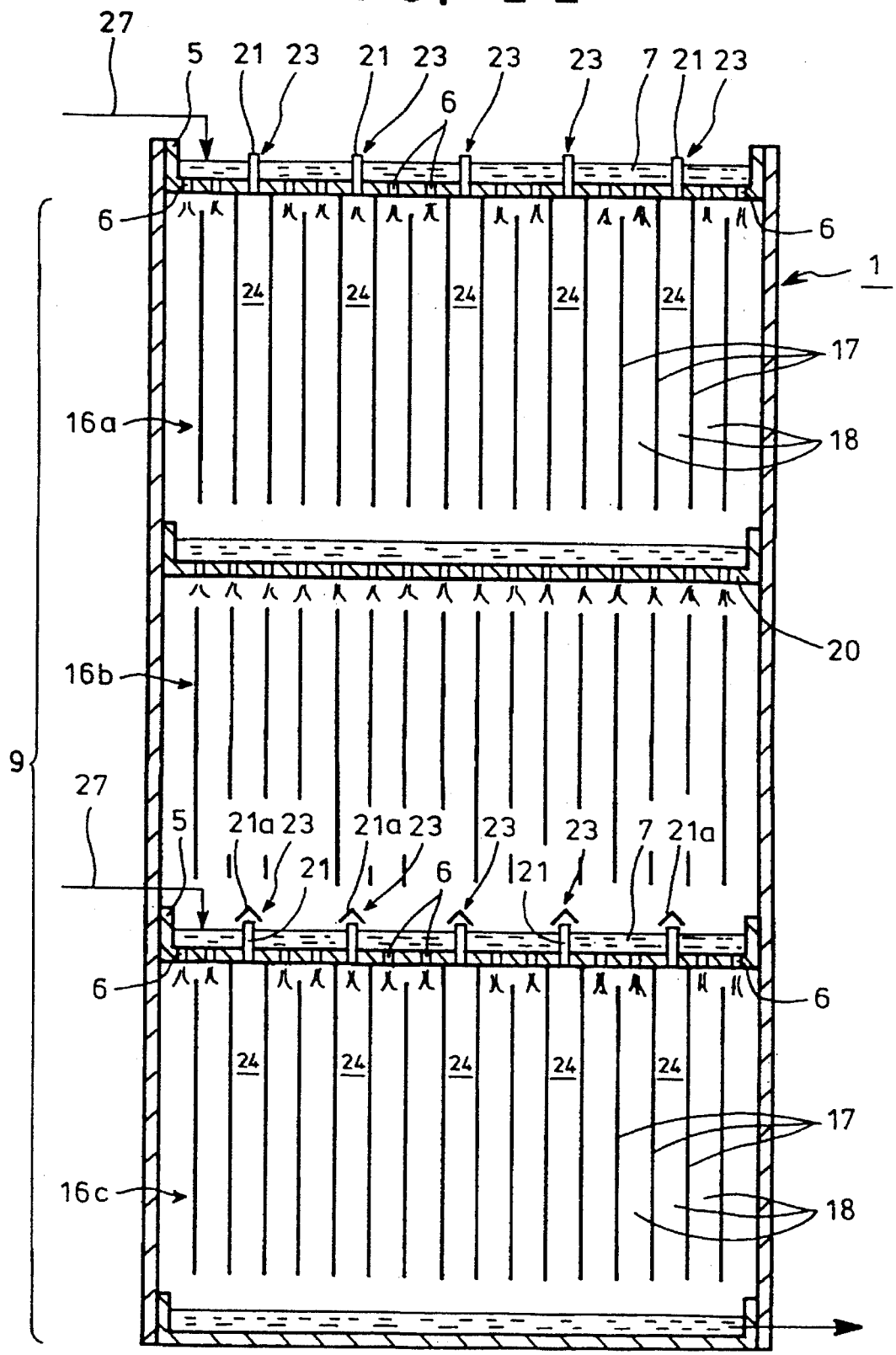
FIG. 11 is a vertical sectional view illustrating a modification of the filler unit shown in FIG. 4 and comprising a stack of filler units.

FIG. 11 illustrates a plurality of the filler units of the type shown in FIG. 4 and stacked vertically. More particularly, depending upon a required cooling capacity of the heat exchanger 9, a plurality of (three in the figure) filler units (16a, 16b and 16c in the figure) are stacked. Required ones of the filler units (16a and 16c in the figure) are of the type described with reference to FIG. 5. Number and positions of the filler units of the type shown in FIG. 5 having the section inlet means 23 and the liquid-level control unit 38 and combination of such filler units with other types of filler units may be arbitrarily varied. The filler unit (16b in the figure) which has no section inlet means 23 and no liquid-level control unit 38 may be of any type other than the type in which the flow passages 18 are defined by the heat exchange surface members 17.

A filler unit (16c in the figure) other than an uppermost filler unit may have the section inlet means 23 and the liquid level control unit 38. In this case, a water deflecting plate 21a is installed over each upper water intake port 21 so as to prevent the water 7 from the upstream filler unit (16b in the figure) from directly flowing into the upper intake port 21 of the downstream filler unit (16c in the figure).

The water 7 is partly evaporated and decreased in volume before flowing into the upper water vessel 5 of the filler unit (16c in the figure) other than the uppermost filler unit. Therefore, at the filler unit 16c, water is supplied through a water supply pipe 27 to the water vessel 5 in compensation for the evaporated water, thereby adjusting the water level.

Just like the filler unit shown in FIGS. 4, 5 and 6, also in the stacked filler units shown in FIG. 11, the water 7 may be cooled at the maximum capacity in a normal condition. In a condition with a possibility of the white smoke being generated, selective dry/wet spaces 24 may be utilized for prevention of the white smoke from being generated.

Figure 12:
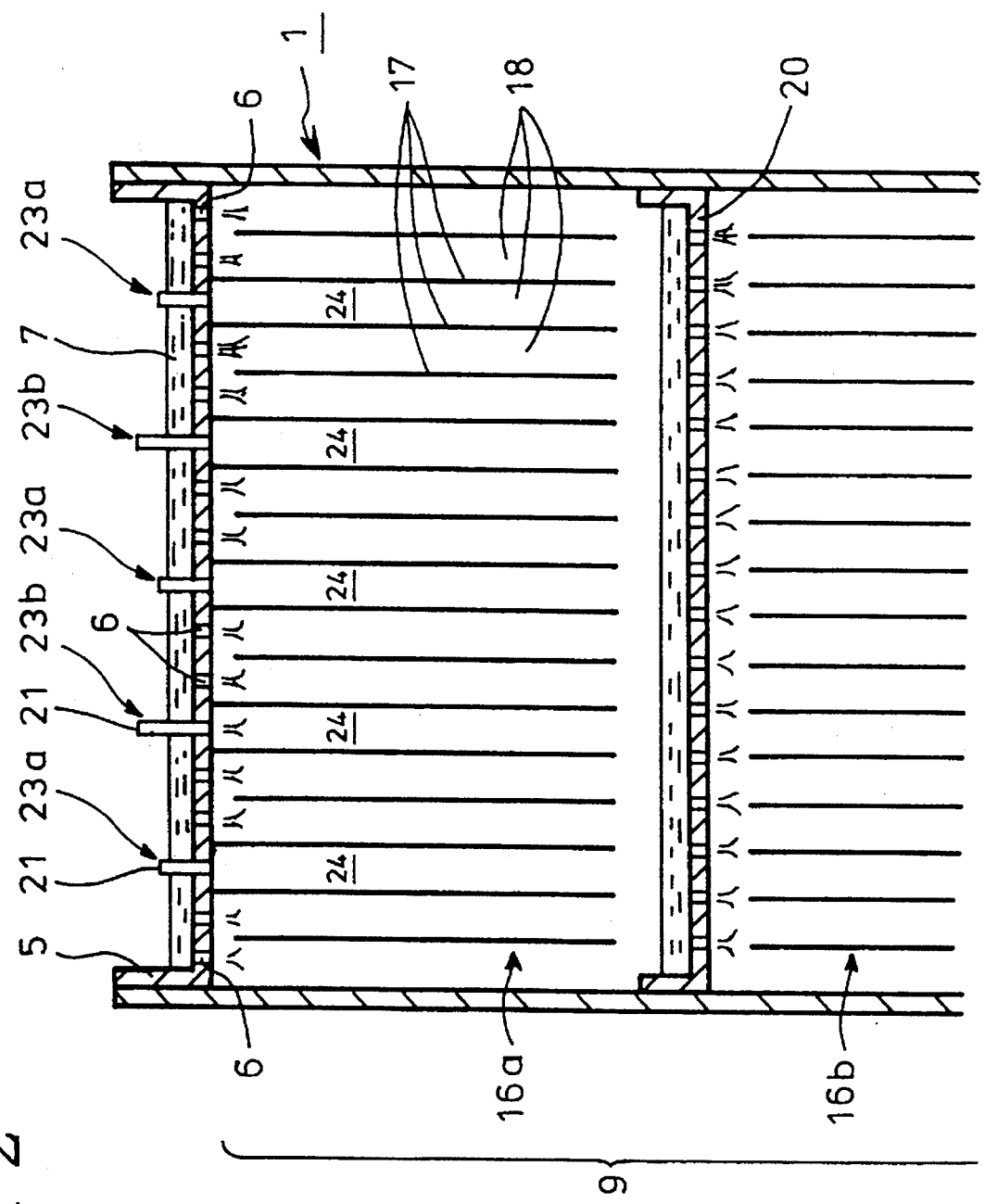
FIG. 12 is a vertical sectional view illustrating a modification of the section inlet means shown in FIG. 11 with different heights.

FIG. 12 shows a modification of the section inlet means 23 having different heights. In order that the water 7 may flow through some of the spaces 24 and not through the other of the spaces 24, section inlet means (23a and 23b in the figure) with the upper intake ports 21 having different heights are used, though the height of the array of upper intake ports 21 communicating with one and the same space 24 is the same. When the section inlet means 23 as shown in FIG. 12 having different heights are utilized for the single filler unit shown in FIG. 4 or for the stacked filler units shown in FIG. 11, the volume of the dry air (See FIG. 2) generated can be controlled or adjusted depending upon the condition of the white smoke being generated, so that wasteful excess generation of the dry air 15 can be avoided.

Figure 13:
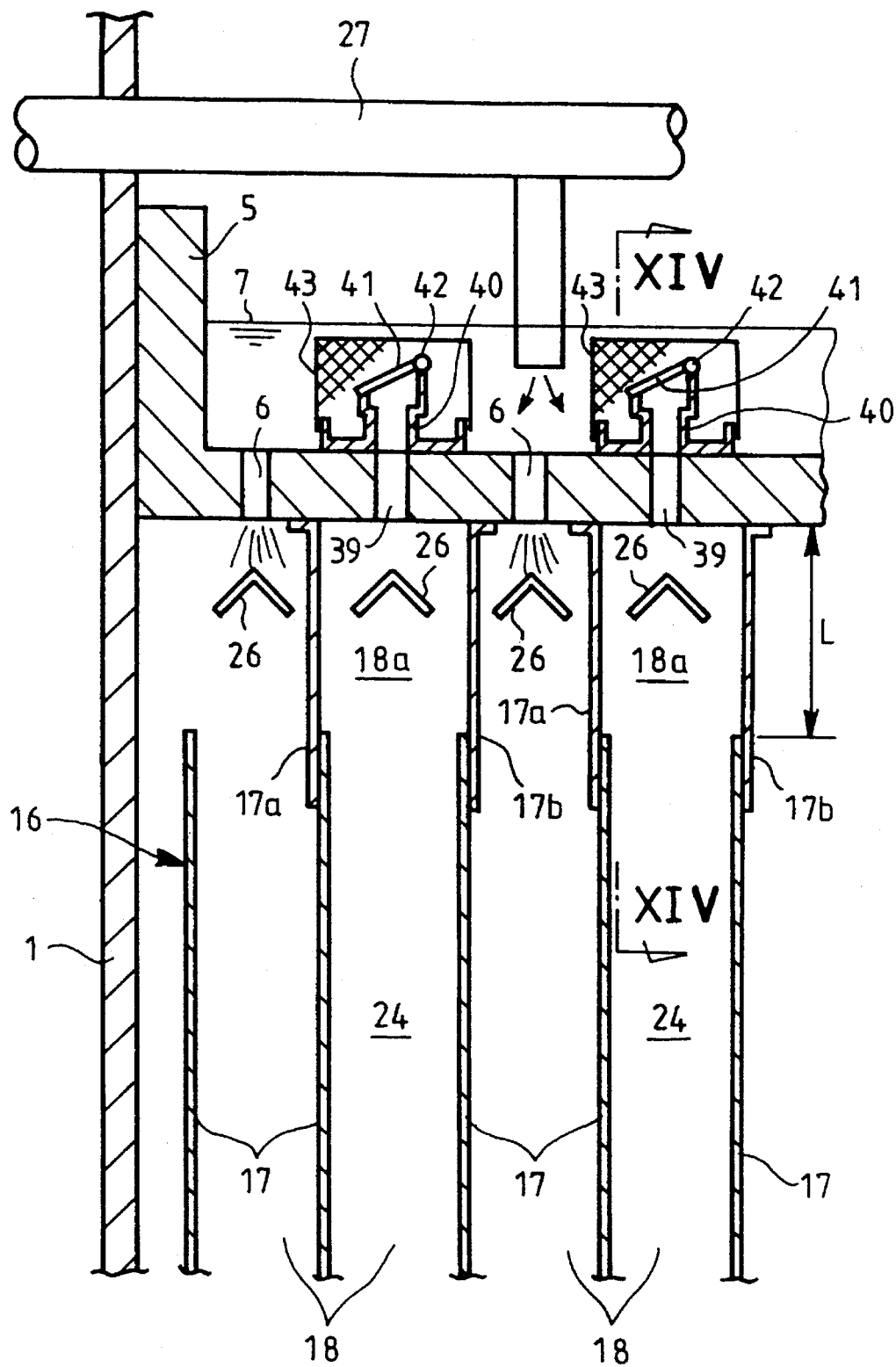
FIG. 13 is a detailed partial sectional view of a second embodiment of the present invention.
Figure 14:
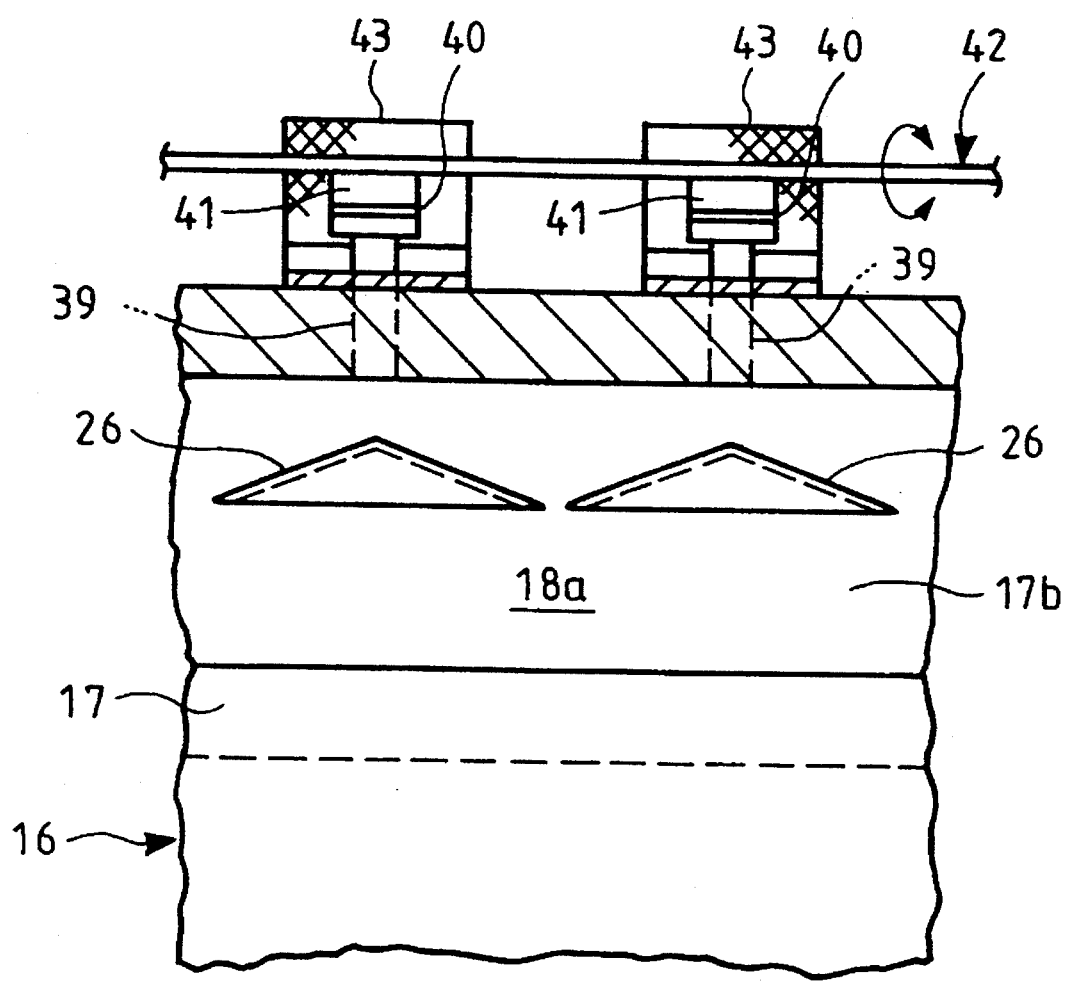
FIG. 14 is a view looking in the direction of arrows XIV—XIV in FIG. 13.

Referring next to FIGS. 13 and 14, a second embodiment of the present invention will be described in detail. In order that the water 7 may flow through some of the flow passages 18 and not through the other of the flow passages 18, the upper water vessel 5 is formed at its bottom with a water flow port 39 in communication with the sectioned chamber 18a, a short upright pipe 40 extends upwardly from the bottom of the vessel 5 in communication with the water flow port 39, and a capshaped valve 41 for opening and closing the water flow port 39 is installed at an upper end of the pipe 40. As best shown in FIG. 14, each array of valves 41 for opening and closing the water flow ports 39 for one and the same sectioned chamber 18a are carried by a common valve drive 42 in the form of a rotatable shaft so that the array of valves 41 can be simultaneously opened or closed. Each pipe 40 is surrounded by a screen 43 such as a wire net so as to prevent intrusion of dust or the like into the pipe 40.

Figure 1:
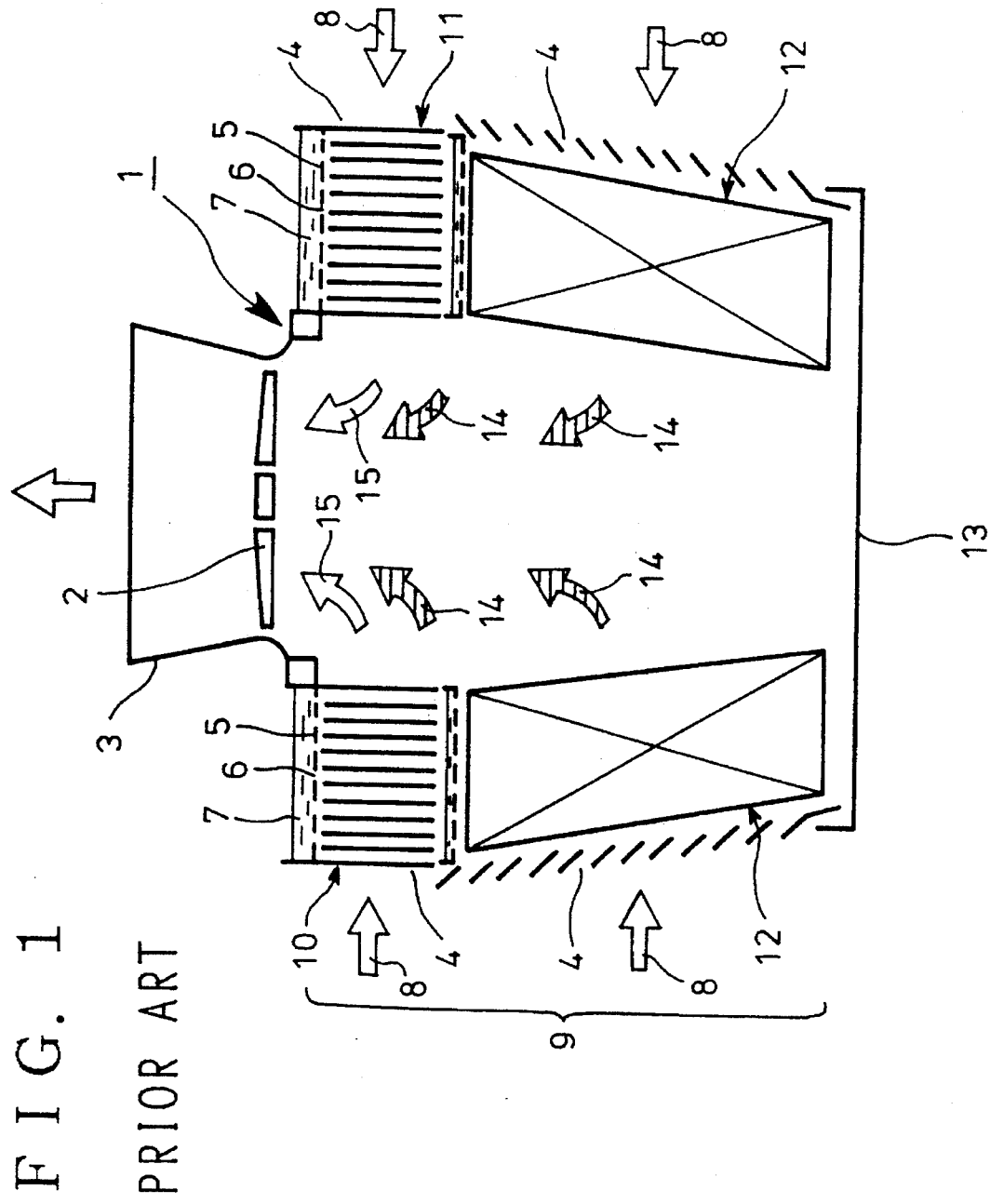
FIG. 1 is a front view in vertical section of a conventional cooling tower.
Figure 2:
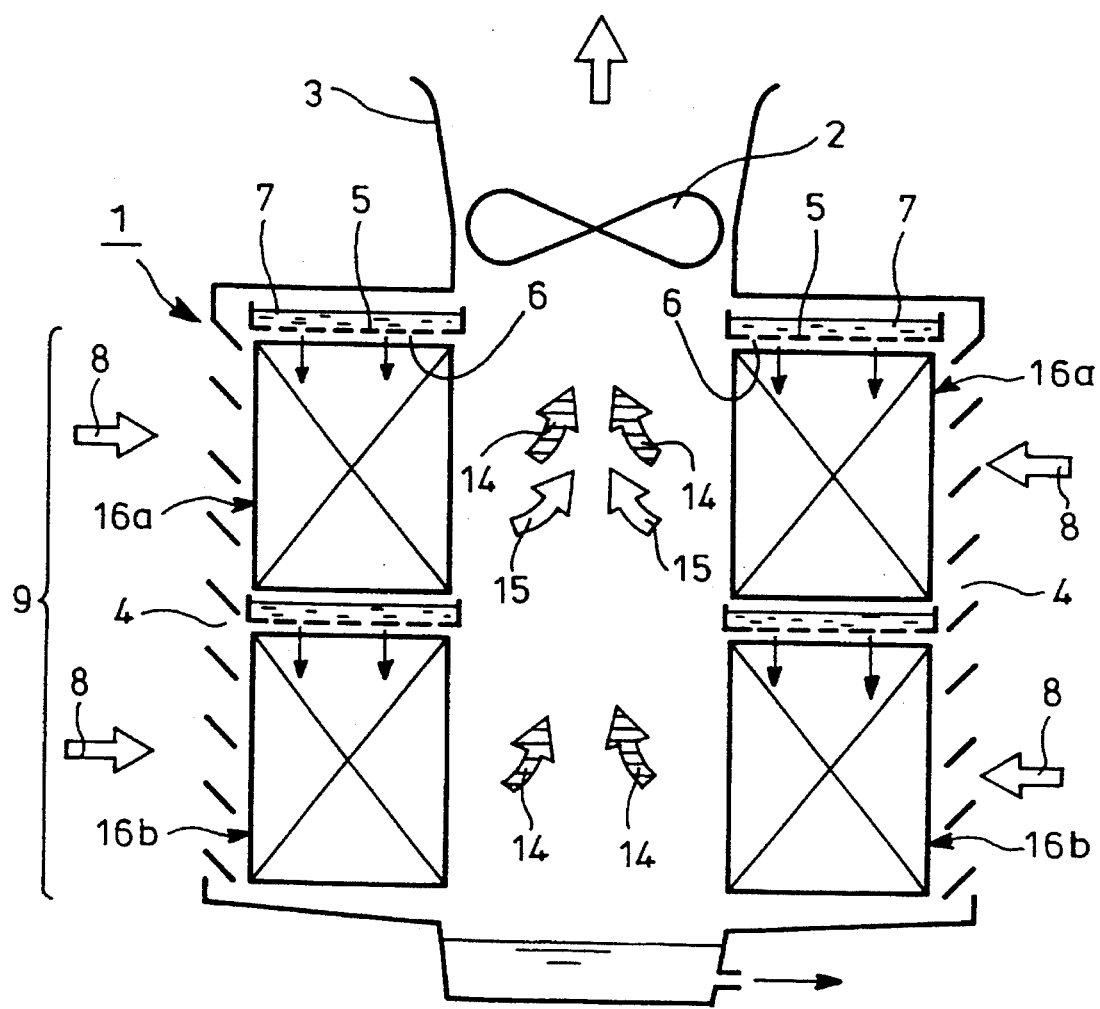
FIG. 2 is a front view in vertical section of a further conventional cooling tower.
Figure 3:
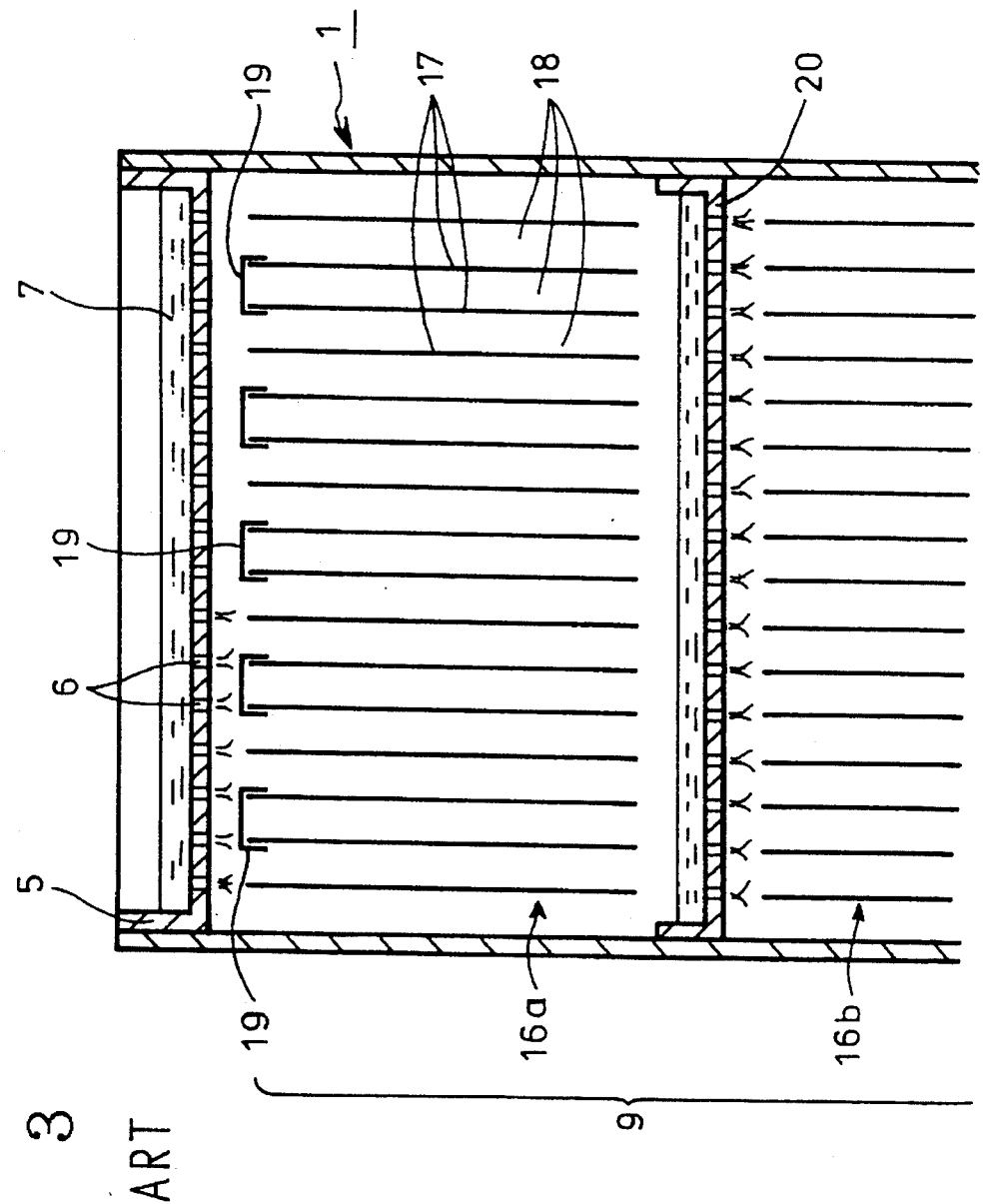
FIG. 3 is a side view in vertical section of the conventional cooling tower shown in FIG. 2.

In a normal condition with no fear of the white smoke being generated due to the ambient air temperature being not so low, the valve drives 42 are activated to open the valves 41 of the pipes 40 in the upper water vessel 5 so that the water 7 is sprayed through the spray ports 6 and the water flow ports 39 over all of the heat exchange surface members 17, whereby the direct cooling of the water 7 flowing through all the passages 18 can be effected by the ambient air 8 (See FIG. 2). It follows therefore that as in summer, when a large quantity of water is required and there is no fear of the white smoke being generated, the filler unit 16 can be operated at the maximum capacity to cool the water 7 at full capacity.

As in winter, in a condition with a possibility of the white smoke being generated, the water flow ports 39 are closed by the valves 41 so that spray of the water 7 into the spaces 24 through the sectioned chambers 18a is interrupted. Therefore, not only the direct cooling of the water 7 by the ambient air 8 (See FIG. 2) in the flow passages 18 into which the water 7 is sprayed but also dry heating of the ambient air 8 in the spaces 24 can be simultaneously carried out. As a result, the wet air 14 (See FIG. 2) generated by the direct cooling in the flow passages 18 in the upper filler unit 16 and a lower filler unit (not shown) is mixed with the dry air 15 generated by the dry heating in the space 24, thereby preventing the white smoke from being generated.

The valves 41 may be driven by the valve drives 42 such that some arrays of valves 41 are opened and the other are closed. By changing the number of valves opened and closed in this way, the quantity of the dry air 15 (See FIG. 2) can be controlled in response to the condition of the white smoke being generated, whereby the water cooling efficiency is enhanced and wasteful excess generation of the dry air 15 can be eliminated.

Figure 15:
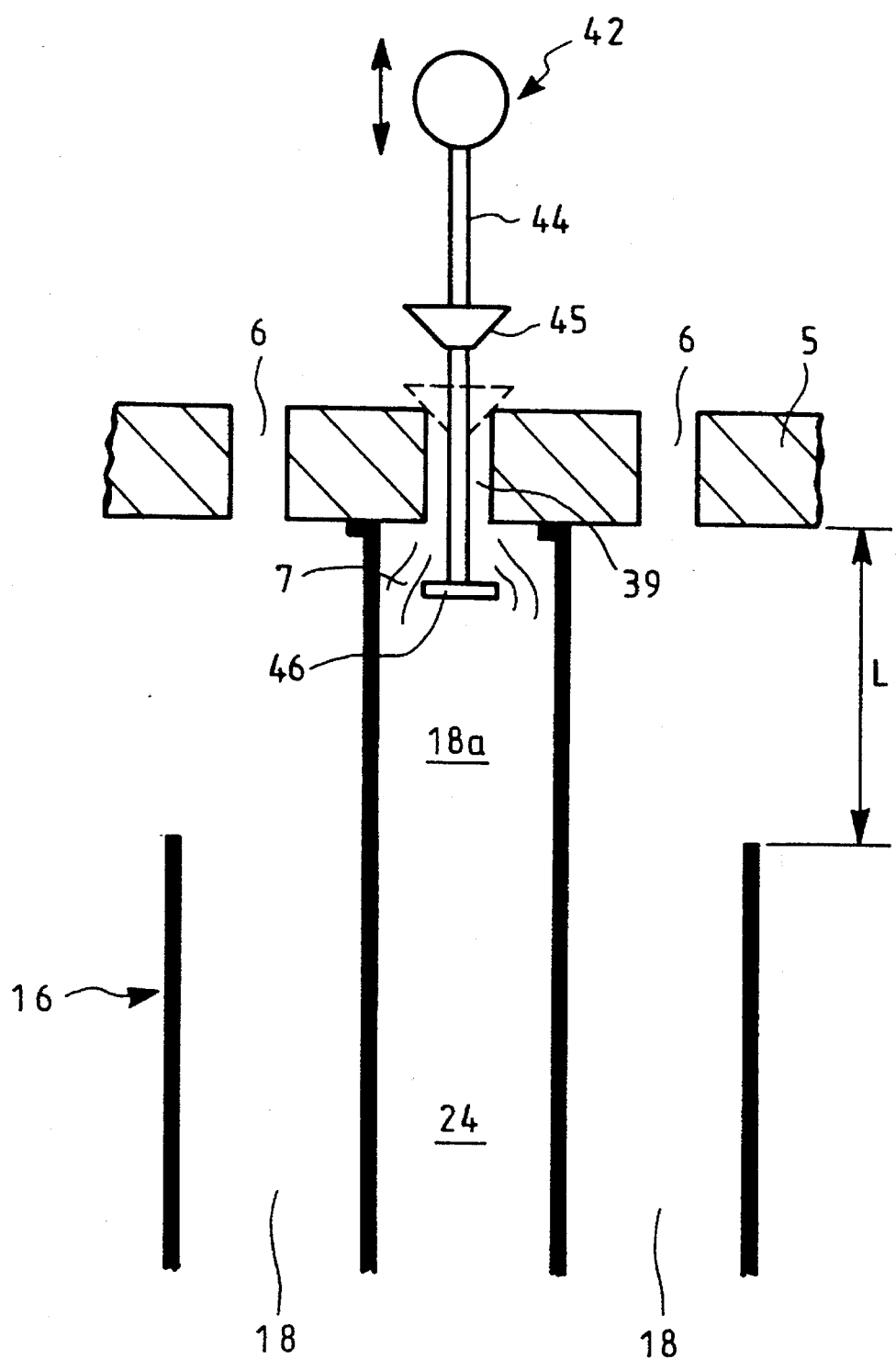
FIG. 15 is a side view illustrating a modification of the valve structure shown in FIG. 13.

FIG. 15 illustrates a modification of the valve structure described above with reference to FIGS. 13 and 14. An inverted frustoconical valve 45 adapted to selectively open and close the water flow port 39 is carried by a shaft 44 extending through the water flow port 39 within the upper water chamber 5 and a dropped-water dispersing plate 46 is securely attached to a lower end of the shaft 44 extending into the sectioned chamber 18. The upper end of the shaft 44 is connected to the valve drive 42 in the form of a vertically movable shaft.

Figure 16:
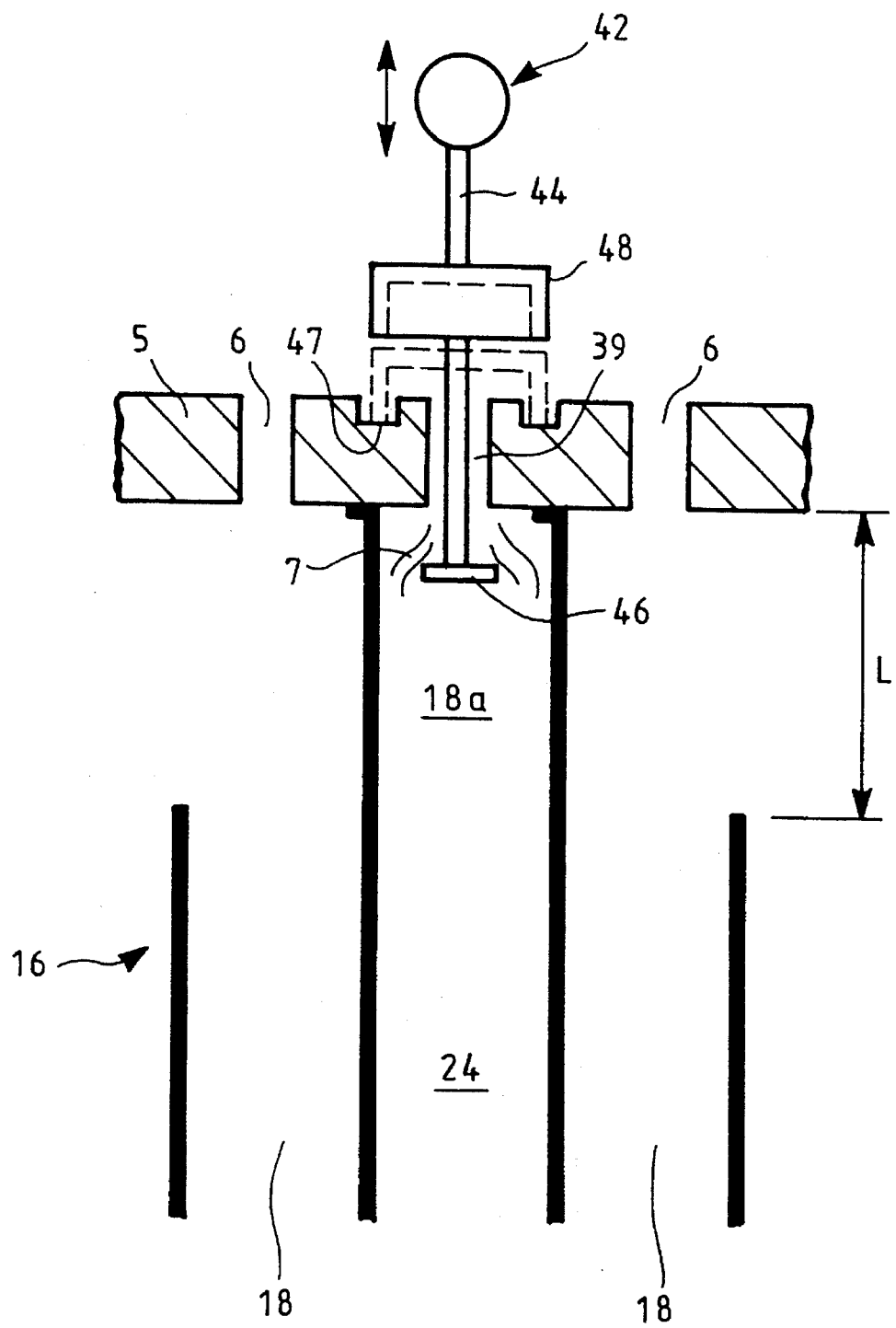
FIG. 16 is a side view illustrating a further modification of the valve structure shown in FIG. 13.

FIG. 16 illustrates a further modification of the valve structure. An annular groove 47 is formed at the bottom surface of the upper water vessel 5 to surround the water flow port 39. An inverted saucer-shaped valve 48 adapted to fit into the annular groove 47 is carried by the shaft 44 extending through the water flow port 39 within the upper water vessel 5. A water dispersing plate 46 is securely attached to a lower end of the shaft 44 extending into the sectioned chamber 18a. The shaft 44 is connected at its upper end to the valve drive 42 in the form of a vertically movable shaft.

With the valve structure shown in FIGS. 15 or 16, the water flow port 39 is closed and opened by vertical movement of the valve 45 or 48. When the valve 45 or 48 is opened and the water 7 flows down through the port 39, it strikes at the water dispersing plate 46 and is dispersed so that it easily tends to adhere to the wall surfaces of the sectioned chamber 18a and the heat exchange surface plates 17, whereby the cooling efficiency can be enhanced.

The valves 45 or 48 may be driven by the valve drives 42 such that some arrays of valves 45 or 48 are opened and the other are closed. By changing the number of valves opened and closed in this way, the quantity of the dry air 15 (See FIG. 2) can be controlled in response to the condition of the white smoke being generated, whereby the water cooling efficiency is enhanced and wasteful excess generation of the dry air 15 can be eliminated.

Figure 17:
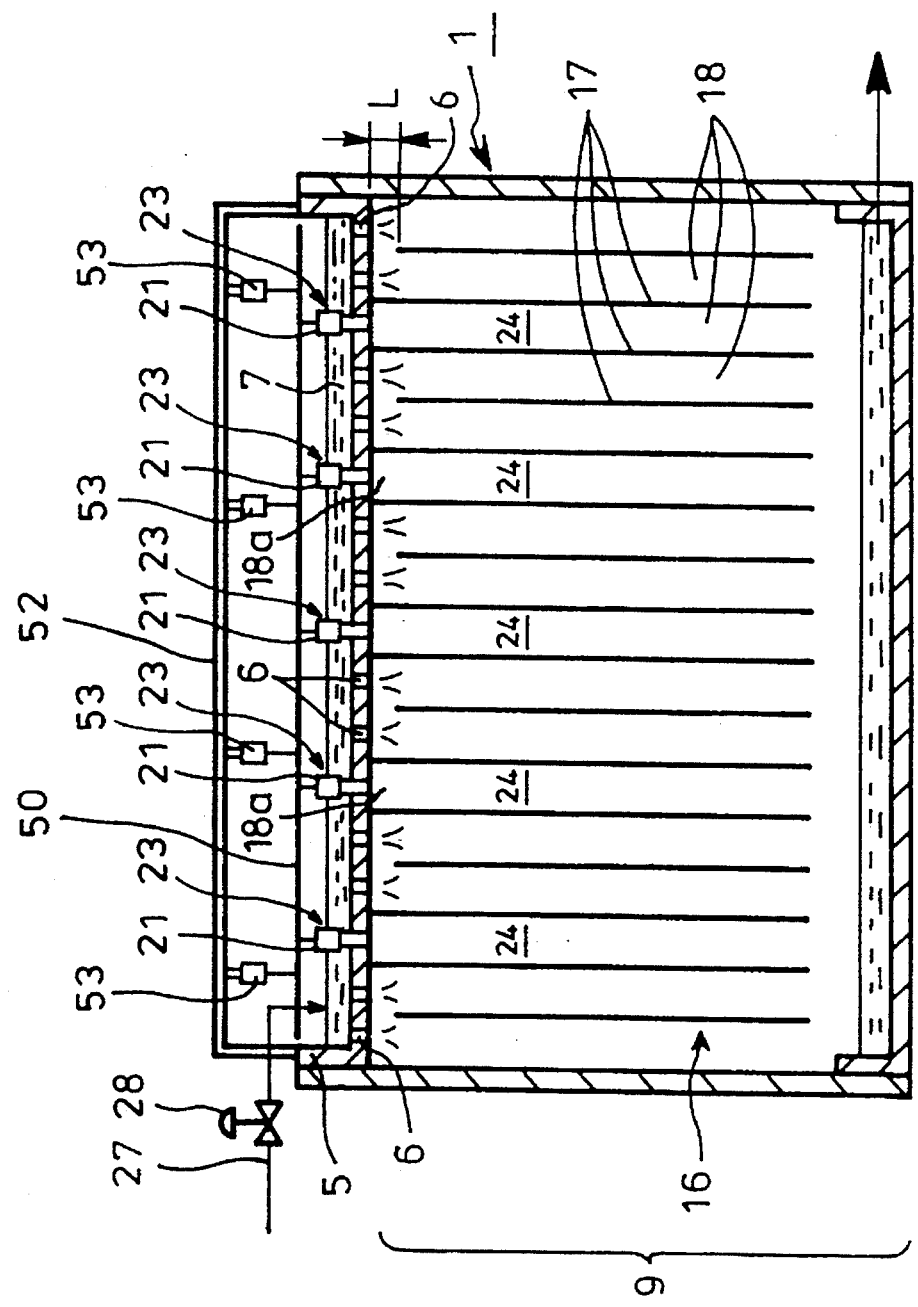
FIG. 17 is a side view in vertical section of a third embodiment of the present invention.
Figure 18:
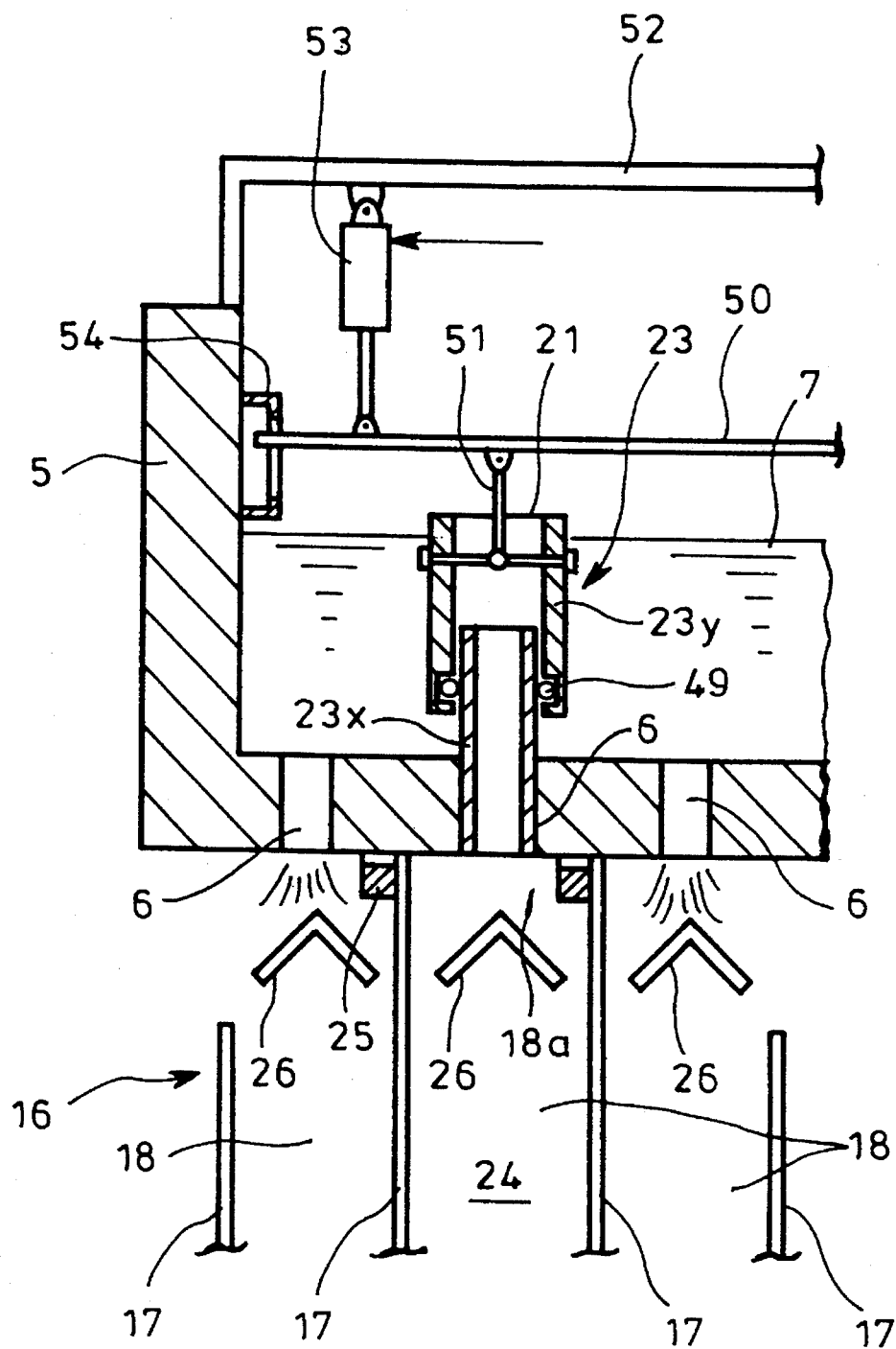
FIG. 18 is a detailed partial view thereof.
Figure 19:
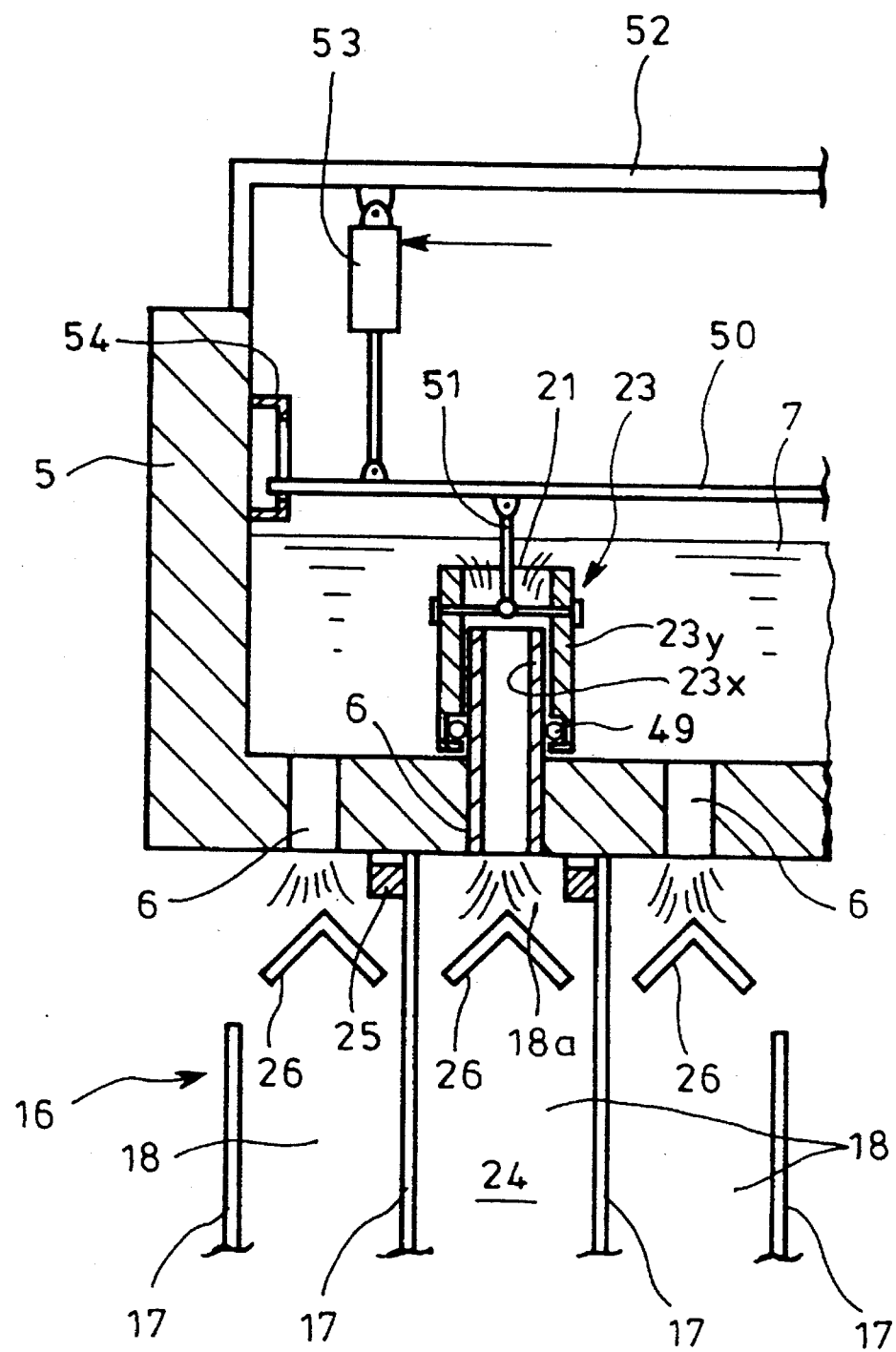
FIG. 19 illustrates that the upper water intake port of the section inlet means shown in FIG. 18 is lowered.

FIGS. 17–19 show a third embodiment of the present invention. As best shown in FIG. 17, the heat exchanger 9 for heat exchange between the water 7 to be cooled and the ambient air 8 comprises a single filler unit 16 having a plurality of heat exchange surface members 17 extending in parallel with each other to define the flow passages 18.

The water 7 is supplied through the water supply pipe 27 to the upper water vessel 5. The degree of opening of the flow regulating valve 28 in the water supply line 27 is controlled in response to, for example, output signals from liquid-level detectors (not shown) disposed in the upper water vessel 5. As a result, the quantity of the water to be supplied to the vessel 5 is controlled such that the level of the water 7 in the vessel 5 is maintained at a predetermined level.

Some of the flow passages 18 of the filler unit 16 are provided with the section inlet means 23 which communicate through the sectioned chambers 18a defined at the water spray space L and each of the section inlet means 23 has the upper intake port 21 above the the spray ports 6 of the vessel 5, whereby selective dry/wet spaces 24 are defined in some of the flow passages 18 of the filler unit 16.

As shown in detail in FIGS. 18 and 19, each section inlet means 23 is in the form of a double pipe comprising a stationary pipe 23x with its lower portion being snugly fitted into the spray port 6 and a vertically movable pipe 23y which is fitted over the stationary pipe 23x through an O-ring 49. The vertically movable pipes 23y of the section inlet means 23 are integrally connected through an attachment member 51 to a horizontally extending connecting bar 50. The connecting bar 50 is vertically movably supported by extendible and retractable actuators (lift means) 53 which are connected at their upper ends to a supporting frame 52 extending above the upper water vessel 5.

Each sectioned chamber 18a is defined by extending upwardly the heat exchange surface members 17 and mounting the same through the mounting members 25 on the undersurface of the upper water vessel 5. The dispersing plate 26 is installed below each of the water spray ports 6 and each inlet means 23 so that the water 7 is dispersed over the heat exchange surface members 17 and flows downwardly thereon.

Reference numeral 54 denotes a lift guide on an inner surface of the upper water vessel 5 for engaging with and vertically guiding an end of the connecting bar 50.

The mode of operation of the third embodiment will be described. In a normal condition with no fear of the white smoke being generated due to the ambient air temperature being not so low, the actuator 53 is extended to lower the vertically movable pipes 23y through the connecting bar 50 such that the upper water intake ports 21 of the pipes 23y is lowered below the level of the water 7 in the upper water vessel 5. As a result, the water 7 is sprayed not only through the water spray ports 6 but also through the inlet means 21 over all the heat exchange surface members 17 in the filler unit 16 and the water 7 is directly cooled by the ambient air (See FIG. 2) in the flow passages 18. Therefore, in the condition such as in summer with no fear of the generation of the white smoke and a large quantity of cooled water is required, whole of the filler unit 16 is operated at maximum capacity to cool the water 7 at full capacity.

In a condition such as in winter with a possibility of the white smoke being generated, the actuator 53 is retracted as shown in FIG. 18 to lift up the vertically movable pipes 23y at the inlet means 23 through the connecting bar 50 such that the the upper water intake ports 21 of the pipes 23y becomes higher than the level of the water 7 in the upper water vessel 5. As a result, spraying of water into the spaces 24 in communication with the upper water intake ports 21 is interrupted. Therefore, not only the direct cooling by the ambient air 8 in the flow passages 18 but also the dry heating of the ambient air 8 flowing through the spaces 24 into which no water 7 is sprayed are carried out simultaneously. The wet air 14 (See FIG. 2) resulting from the direct cooling in the passages 18 is mixed with the dry air 15 resulting from the heating in the spaces 24 so that no white smoke is produced.

As described above, the switching between the direct cooling of the water 7 and the dry heating of the ambient air can be effected in such extremely simple manner that the actuator 53 is extended or retracted to maintain the upper water intake ports 21 within the water 7 in the upper water vessel 5 or to maintain them above the liquid level of the water 7 in the upper water vessel 5. Furthermore, all the moving parts are installed upwardly of the bottom surface of the upper water vessel 5 so that maintenance and repair can be much facilitated.

In the third embodiment as shown, all of the vertically movable pipes 23y are moved simultaneously; alternatively, only some of them may be displaced simultaneously so that, just as disclosed above with respect to the first and second embodiments, quantity of the dry air 15 can be controlled in response to the condition of the white smoke being generated, whereby the water cooling efficiency is enhanced and wasteful excess generation of the dry air 15 can be eliminated.

In the third embodiment as shown, the inlet means 23 in the form of a double pipe. Alternatively, the inlet means 23 may be in the form of bellows.

It is to be understood that the present invention is not limited to the above-described embodiments and that various modifications may be made without departing from the true spirit of the present invention. For instance, the section inlet means and the valve structure may be modified variously and they may be so constructed as to be removable.

What is claimed is:

1. In a process for cooling water in which the water to be cooled is sprayed through water spray ports at a bottom of an upper water vessel into a filler unit having a plurality of heat exchange surface members extending in parallel with each other to define flow passages therebetween and concurrently ambient air is sucked transversely into the flow passages, whereby the water flowing down over the heat exchange surface members is cooled by the ambient air in a cross flow manner, an improvement which comprises sectioning some of said flow passages so as to supply said water to said some of flow passages through upper water intake ports located higher than said water spray ports of said upper water vessel;

in a normal condition with no fear of white smoke being generated, maintaining the water in said upper water vessel at a level higher than said upper water intake ports, thereby spraying said water over all of said heat exchange surface members and effecting direct cooling of the water in every flow passage by the ambient air, and in a condition with a possibility of the white smoke being generated, maintaining said water in said upper water vessel at a level below said upper water intake ports so that the spray of said water into the flow passages communicated with said upper water intake ports is interrupted, whereby the direct cooling by the ambient air of said water in the flow passages into which said water is sprayed is effected simultaneously with dry heating of the ambient air flowing through the flow passages into which no water is sprayed and wet air resulting from said direct cooling is mixed with dry air resulting from said dry heating.

2. In a cooling tower having an outlet with an axial flow fan at a top of a casing, air inlets at an outer periphery of the casing, an upper water vessel at the upper portion of the casing and a heat exchanger below the upper water vessel in which water to be cooled is sprayed through water spray ports of the water vessel and is heat-exchanged in a cross flow manner with ambient air sucked transversely into the casing through the air inlets, the improvement which comprises said heat exchanger comprising one or more filler units stacked vertically, said one filler unit or at least an uppermost filler unit in said vertically stacked filler units including a plurality of heat exchange surface members extending in parallel with each other to define flow passages therebetween, section inlet means which are communicated with some of the flow passages in the filler unit through sectioned chambers and which have upper water intake ports higher than the water spray ports of the upper water vessel, thereby providing selective dry/wet spaces in said filler units, and a liquid-level control unit for controlling height of a liquid level in the upper water vessel.

3. A cooling tower according to claim 2, wherein in the case of water spray space being defined between the upper water vessel and the uppermost filler unit, each sectioned chamber is defined by partition plates arranged to sandwich said heat exchange surface members defining a flow passage.

4. A cooling tower according to claim 2, wherein each compartment is defined by said heat exchange surface members.

5. A cooling tower according to claim 4, wherein in the case of water spray space being defined between the upper water vessel and the uppermost filler unit, each sectioned chamber is defined by partition plates arranged to sandwich said heat exchange surface members defining a flow passage.

6. A cooling tower as defined in claim 2, wherein in any filler unit except the uppermost filler unit and having section inlet means with upper water intake ports, a water deflecting plate is disposed above each of said upper water intake ports.

7. A cooling tower according to claim 6, wherein in the case of water spray space being defined between the upper water vessel and the uppermost filler unit, each sectioned chamber is defined by partition plates arranged to sandwich said heat exchange surface members defining a flow passage.

8. A cooling tower according to claim 6, wherein each compartment is defined by said heat exchange surface members.

9. A cooling tower according to claim 8, wherein in the case of water spray space being defined between the upper water vessel and the uppermost filler unit, each sectioned chamber is defined by partition plates arranged to sandwich said heat exchange surface members defining a flow passage.

10. A cooling tower as defined in claim 2, wherein said liquid-level control unit is provided with liquid level detectors for said upper water vessel.

11. A cooling tower according to claim 10, wherein in the case of water spray space being defined between the upper water vessel and the uppermost filler unit, each sectioned chamber is defined by partition plates arranged to sandwich said heat exchange surface members defining a flow passage.

12. A cooling tower according to claim 10, wherein each compartment is defined by said heat exchange surface members.

13. A cooling tower according to claim 12, wherein in the case of water spray space being defined between the upper water vessel and the uppermost filler unit, each sectioned chamber is defined by partition plates arranged to sandwich said heat exchange surface members defining a flow passage.

14. A cooling tower as defined in claim 10, wherein in any filler unit except the uppermost filler unit and having section inlet means with upper water intake ports, a water deflecting plate is disposed above each of said upper water intake ports.

15. A cooling tower according to claim 14, wherein in the case of water spray space being defined between the upper water vessel and the uppermost filler unit, each sectioned chamber is defined by partition plates arranged to sandwich said heat exchange surface members defining a flow passage.

16. A cooling tower according to claim 14, wherein each compartment is defined by said heat exchange surface members.

17. A cooling tower according to claim 16, wherein in the case of water spray space being defined between the upper water vessel and the uppermost filler unit, each sectioned chamber is defined by partition plates arranged to sandwich said heat exchange surface members defining a flow passage.

18. A cooling tower as defined in claim 2, wherein the water intake ports of said section inlet means have different heights.

19. A cooling tower according to claim 18, wherein in the case of water spray space being defined between the upper water vessel and the uppermost filler unit, each sectioned chamber is defined by partition plates arranged to sandwich said heat exchange surface members defining a flow passage.

20. A cooling tower according to claim 18, wherein each compartment is defined by said heat exchange surface members.

21. A cooling tower according to claim 20, wherein in the case of water spray space being defined between the upper water vessel and the uppermost filler unit, each sectioned chamber is defined by partition plates arranged to sandwich said heat exchange surface members defining a flow passage.

22. A cooling tower as defined in claim 18, wherein in any filler unit except the uppermost filler unit and having section inlet means with upper water intake ports, a water deflecting plate is disposed above each of said upper water intake ports.

23. A cooling tower according to claim 22, wherein in the case of water spray space being defined between the upper water vessel and the uppermost filler unit, each sectioned chamber is defined by partition plates arranged to sandwich said heat exchange surface members defining a flow passage.

24. A cooling tower according to claim 22, wherein each compartment is defined by said heat exchange surface members.

25. A cooling tower according to claim 24, wherein in the case of water spray space being defined between the upper water vessel and the uppermost filler unit, each sectioned chamber is defined by partition plates arranged to sandwich said heat exchange surface members defining a flow passage.

26. A cooling tower as defined in claim 18, wherein said liquid-level control unit is provided with liquid level detectors for said upper water vessel.

27. A cooling tower according to claim 26, wherein in the case of water spray space being defined between the upper water vessel and the uppermost filler unit, each sectioned chamber is defined by partition plates arranged to sandwich said heat exchange surface members defining a flow passage.

28. A cooling tower according to claim 26, wherein each compartment is defined by said heat exchange surface members.

29. A cooling tower according to claim 28, wherein in the case of water spray space being defined between the upper water vessel and the uppermost filler unit, each sectioned chamber is defined by partition plates arranged to sandwich said heat exchange surface members defining a flow passage.

30. A cooling tower as defined in claim 26, wherein in any filler unit except the uppermost filler unit and having section inlet means with upper water intake ports, a water deflecting plate is disposed above each of said upper water intake ports.

31. A cooling tower according to claim 30, wherein in the case of water spray space being defined between the upper water vessel and the uppermost filler unit, each sectioned chamber is defined by partition plates arranged to sandwich said heat exchange surface members defining a flow passage.

32. A cooling tower according to claim 30, wherein each compartment is defined by said heat exchange surface members.

33. A cooling tower according to claim 32, wherein in the case of water spray space being defined between the upper water vessel and the uppermost filler unit, each sectioned chamber is defined by partition plates arranged to sandwich said heat exchange surface members defining a flow passage.

* * * * *